(12) United States Patent
Jung et al.

(10) Patent No.: US 11,284,085 B2
(45) Date of Patent: Mar. 22, 2022

(54) METHOD FOR ENCODING AND DECODING IMAGES, ENCODING AND DECODING DEVICE, AND CORRESPONDING COMPUTER PROGRAMS

(71) Applicant: ORANGE, Issy-les-Moulineaux (FR)

(72) Inventors: Joel Jung, Chatillon (FR); Felix Henry, Chatillon (FR); Bappaditya Ray, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/628,467

(22) PCT Filed: Jun. 28, 2018

(86) PCT No.: PCT/FR2018/051579
§ 371 (c)(1),
(2) Date: Jan. 3, 2020

(87) PCT Pub. No.: WO2019/008253
PCT Pub. Date: Jan. 10, 2019

(65) Prior Publication Data
US 2020/0128251 A1 Apr. 23, 2020

(30) Foreign Application Priority Data
Jul. 5, 2017 (FR) ...................................... 1756317

(51) Int. Cl.
*H04N 19/14* (2014.01)
*H04N 19/105* (2014.01)
(Continued)

(52) U.S. Cl.
CPC ........... *H04N 19/14* (2014.11); *H04N 19/105* (2014.11); *H04N 19/119* (2014.11); *H04N 19/176* (2014.11)

(58) Field of Classification Search
None
See application file for complete search history.

(56) References Cited

U.S. PATENT DOCUMENTS 6,215,898 B1  4/2001  Woodfill et al.
2014/0028793 A1  1/2014  Wiegand et al.
(Continued)

OTHER PUBLICATIONS

International Search Report dated Oct. 9, 2018, for corresponding International Application No. PCT/FR2018/051579, filed Jun. 28, 2018.
(Continued)

*Primary Examiner* — Chikaodili E Anyikire
(74) *Attorney, Agent, or Firm* — David D. Brush; Westman, Champlin & Koehler, P.A.

(57) ABSTRACT

A method and device for encoding an image divided into blocks. The image contains separate first and second zones). The encoding implements the following, for at least one current block of the image: determining to which of the first and second zones the current block pertains; if the current block pertains to the first zone, encoding the current block by using a first encoding method; if the current block pertains to the second zone, encoding the current block by using a second encoding method including the following: from the position of the current block in the second zone, identifying a previously encoded, then decoded block located in the first zone of the image; and reproducing the value of at least one encoding parameter associated with the identified block.

13 Claims, 12 Drawing Sheets

C5b-FIG.1A

(51) Int. Cl.
*H04N 19/119* (2014.01)
*H04N 19/176* (2014.01)

(56) References Cited

U.S. PATENT DOCUMENTS

| | | | |
|---|---|---|---|
| 2014/0092998 | A1 | 4/2014 | Zhu et al. |
| 2014/0098189 | A1 | 4/2014 | Deng et al. |
| 2014/0354771 | A1* | 12/2014 | Wang .................. H04N 19/503 348/43 |
| 2016/0234510 | A1 | 8/2016 | Lin et al. |
| 2016/0330471 | A1 | 11/2016 | Zhu et al. |
| 2016/0353117 | A1 | 12/2016 | Seregin et al. |
| 2017/0134743 | A1 | 5/2017 | Sim et al. |
| 2017/0310994 | A1 | 10/2017 | Seo et al. |
| 2018/0302645 | A1 | 10/2018 | Laroche et al. |

OTHER PUBLICATIONS

English translation of the International Written Opinion dated Oct. 22, 2018, for corresponding International Application No. PCT/FR2018/051579, filed Jun. 28, 2018.
International Search Report dated Oct. 9, 2018, for corresponding International Application No. PCT/FR2018/051580 filed Jun. 28, 2018.
English translation of the International Written Opinion dated Oct. 22, 2018, for corresponding International Application No. PCT/FR2018/051580, filed Jun. 28, 2018.
Laroche G. et al., "AHG10: On IBC memory reduction", Joint Collaborative Team on Video Coding (JCT-VC) of ITU-T SG 16 WP 3 and ISO/IEC JTC 1/SC 29/WG 11, 20th Meeting: Geneva, CH, 10-18, Document JCTVC-T0051, dated Feb. 9, 2015.
Ralf Schäfer et al., "The Emerging H.264/AVC Standard", Audio/Vido Coding, EBU Technical Review—Jan. 2003.
Corrected Notice of Allowance dated Jun. 14, 2021 for corresponding U.S. Appl. No. 16/628,486, filed Jan. 3, 2020.
Final Office Action dated Dec. 16, 2020 for corresponding U.S. Appl. No. 16/628,470, filed Jan. 3, 2020.
Final Office Action dated Dec. 14, 2020 for corresponding U.S. Appl. No. 16/628,486, filed Jan. 3, 2020.
Notice of Allowance dated Apr. 27, 2021 for corresponding U.S. Appl. No. 16/628,486, filed Jan. 3, 2020.
Office Action dated May 27, 2021 for U.S. Appl. No. 16/628,470, filed Jan. 3, 2020.
ISO/IEC/23008-2 Recommendation ITU-T H.265 High Efficiency Video Coding (HEVC).
Office Action dated Jun. 19, 2020 for corresponding U.S. Appl. No. 16/628,486, filed Jan. 3, 2020.
Office Action dated Jul. 13, 2020 for corresponding U.S. Appl. No. 16/628,470, filed Jan. 3, 2020.
International Search Report dated Jan. 8, 2019 for corresponding International Application No. PCT/FR2018/051581, filed Jun. 28, 2018.
Written Opinion of the International Searching Authority dated Jan. 8, 2019 for corresponding International Application No. PCT/FR2018/051581, filed Jun. 28, 2018.
English translation of the Written Opinion of the International Searching Authority dated Jan. 18, 2019 for corresponding International Application No. PCT/FR2018/051581, filed Jun. 28, 2018.
Shan Liu et al., "Overview of HEVC extensions on screen content coding", 11-15 APSIPA Transactions on Signal and Information Processing, vol. 4, Jan. 1, 2015 (Jan. 1, 2015), XP055454972.
Gary J. Sullivan et al., "Overview of the High Efficiency Video Coding (HEVC) Standard", IEEE Transactions on Circuits and Systems for Video Technology, vol. 22, No. 12, Dec. 2012.
Detlev Marpe, Heiko Schwarz, and Thomas Wiegand "Context-Based Adaptive Binary Arithmetic Coding in the H.264/AVC Video Compression Standard", IEEE Transactions on Circuits and Systems for Video Technology, vol. 13, No. 7, Jul. 2003.
Samelak Jaroslaw et al:., "Efficient frame-compatible stereoscopic video coding using HEVC screen content coding", 2017 International Conference on Systems, Signals and Image Processing (IWSSIP), IEEE, May 22, 2017 (May 22, 2017), pp. 1-5, XP033112648.
"Chen Y et al., ""AHG10: Motion related hooks for HEVC multiview/3DV extension based on long-term reference pictures""", 10. JCT-VC Meeting; 101. MPEG Meeting; Jul. 11, 2012-Jul. 20, 2012, Stockholm, (Joint Collaborative Team on Video Coding of ISO/IEC JTC1/SC29/WG11 and ITU-T SG.16 );URL: http://wftp3.itu.int/av-arch/jctvc-site/,, No. JCTVC-J0121. Jul. 3, 2012 (Jul. 3, 2012), XP030112483."
"Chen Y et al., ""Test Model 11 of 3D-HEVC and MV-HEVC""", 11. JCT-3V Meeting; Feb. 12, 2015-Feb. 18, 2015; Geneva; (The Joint Collaborative Team on 3D Video Coding Extension Development OFISO/IEC JTC1/SC29/WG11 and ITU-T SG.16 ); URL: http://phenix.int-evry.fr/jct2/,, No. JCT3V-K1003, May 1, 2015 (May 1, 2015), XP030132748."
Philipp Helle et al., "BLock Merging for Quadtree-Based Partitioning in HEVC", IEEE Transaction on Circuits and Systems for Video Technology, Institut of Electrical and Electronics Engineers, USA, vol. 22, No. 12, Dec. 1, 2012 (Dec. 1, 2012), pp. 1720-1731, XP011487155.
Anonymous: "Study Text of ISO/IEC 14496-10:200X/FPDAM 1", 88. MPEG Meeting; Apr. 20, 2009-Apr. 24, 2009; MAUI; (Motion Picture Expert Group or ISO/IEC JTC1/SC29/WG11),, No. N10540, Apr. 25, 2009 (Apr. 25, 2009), XP030017039.
Li B. et al., "Non-SCCE1: Unification of intro BC and inter modes", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: Http://WFTP3.ITU.INT/AV-ARCH/JCTVC-SITE/,, No. JCTVC-R0100-v2, Jun. 29, 2014 (Jun. 29, 2014), XP030116357.
Jaroslaw Samelak et al., "Experimental Results for Frame Compatible Multiview Video Coding Using HEVC SCC" 26. JCT-VC Meeting; Jan. 12, 2017-Jan. 20, 2017; Geneva; (Joint Collaborative Team on Video Coding of ISO/IEC JTC1/SC29/WG11 and ITU-T SG.16); URL: Http://WFTP3.ITU.INT/AV-ARCH/JCTVC-SITE/,, No. JCTVC-Z0041, Jan. 13, 2017 (Jan. 13, 2017), XP030118149.
Notice of Allowance dated Oct. 25, 2021 for corresponding U.S. Appl. No. 16/628,470, filed Jan. 3, 2020.

\* cited by examiner

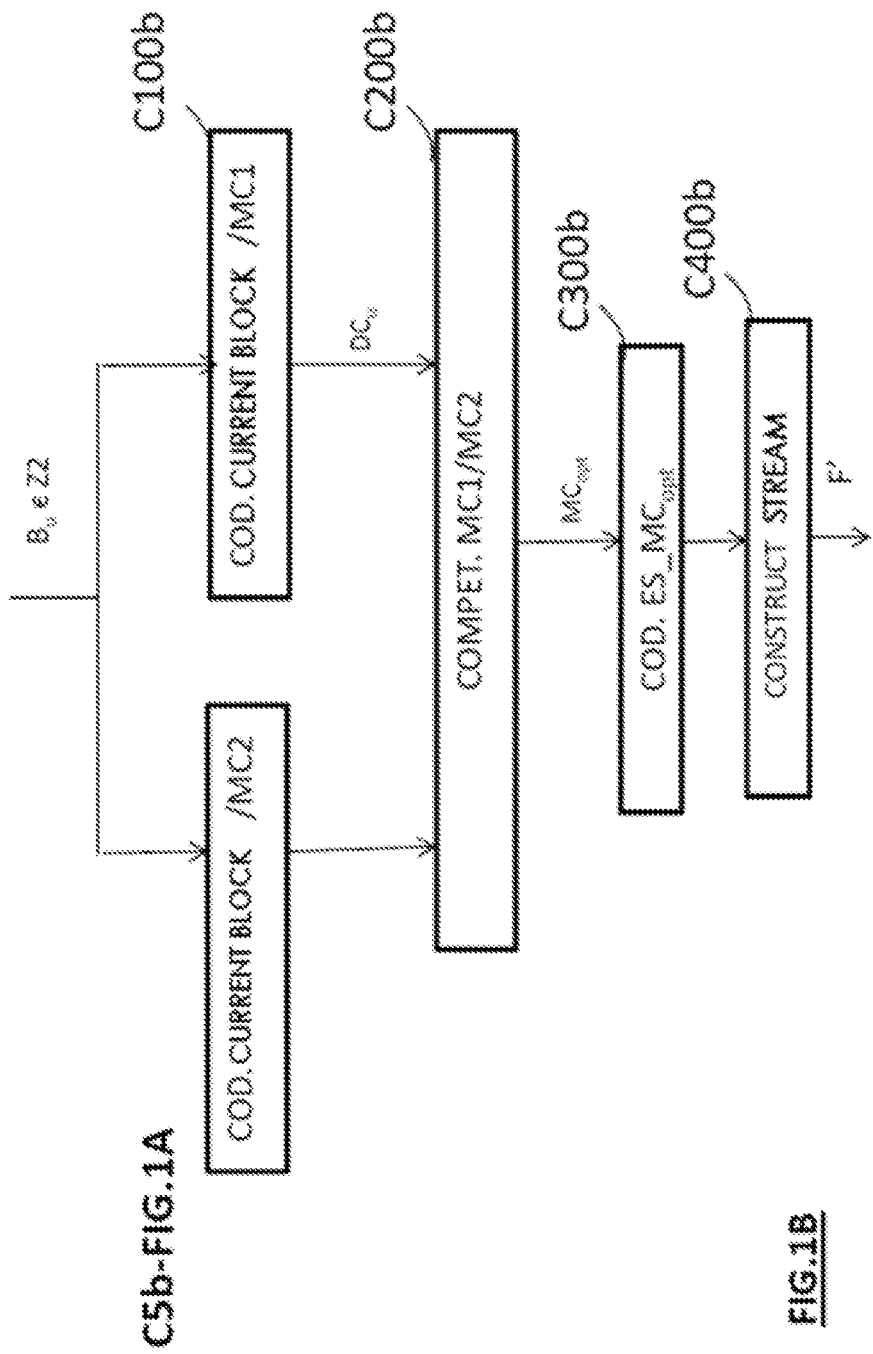

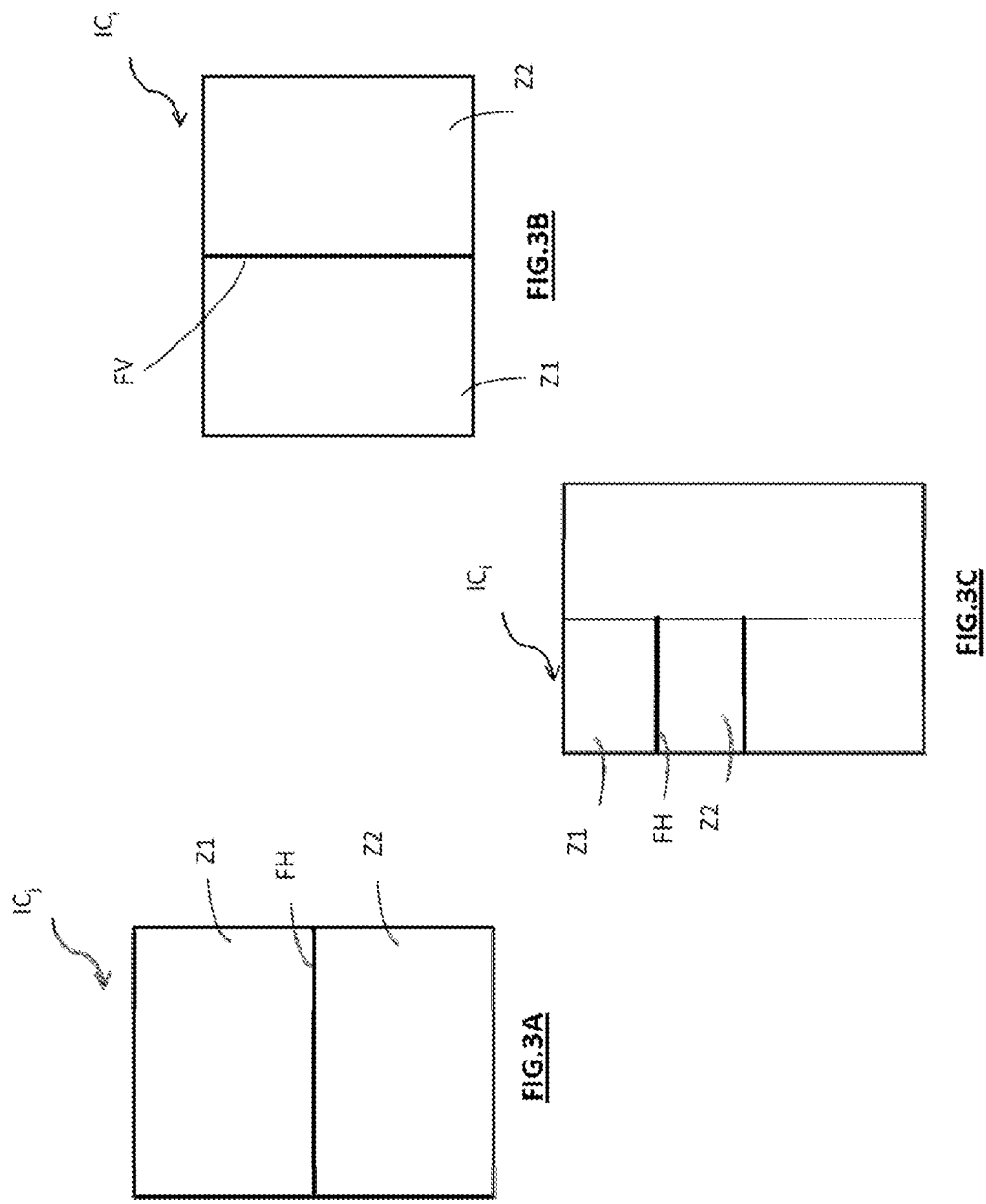

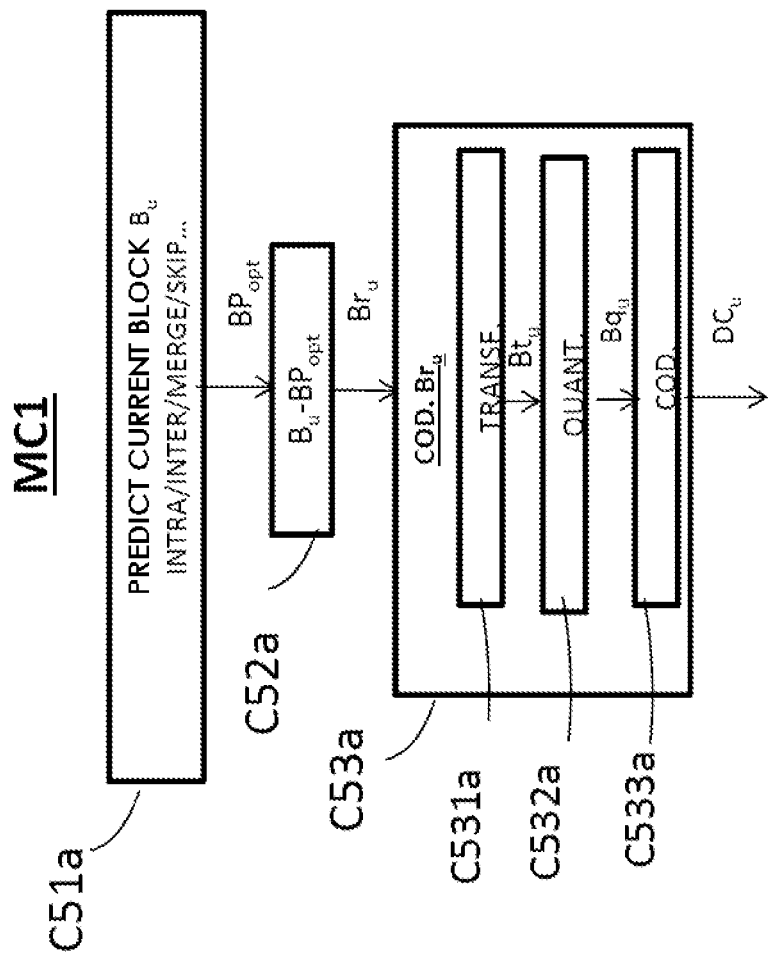

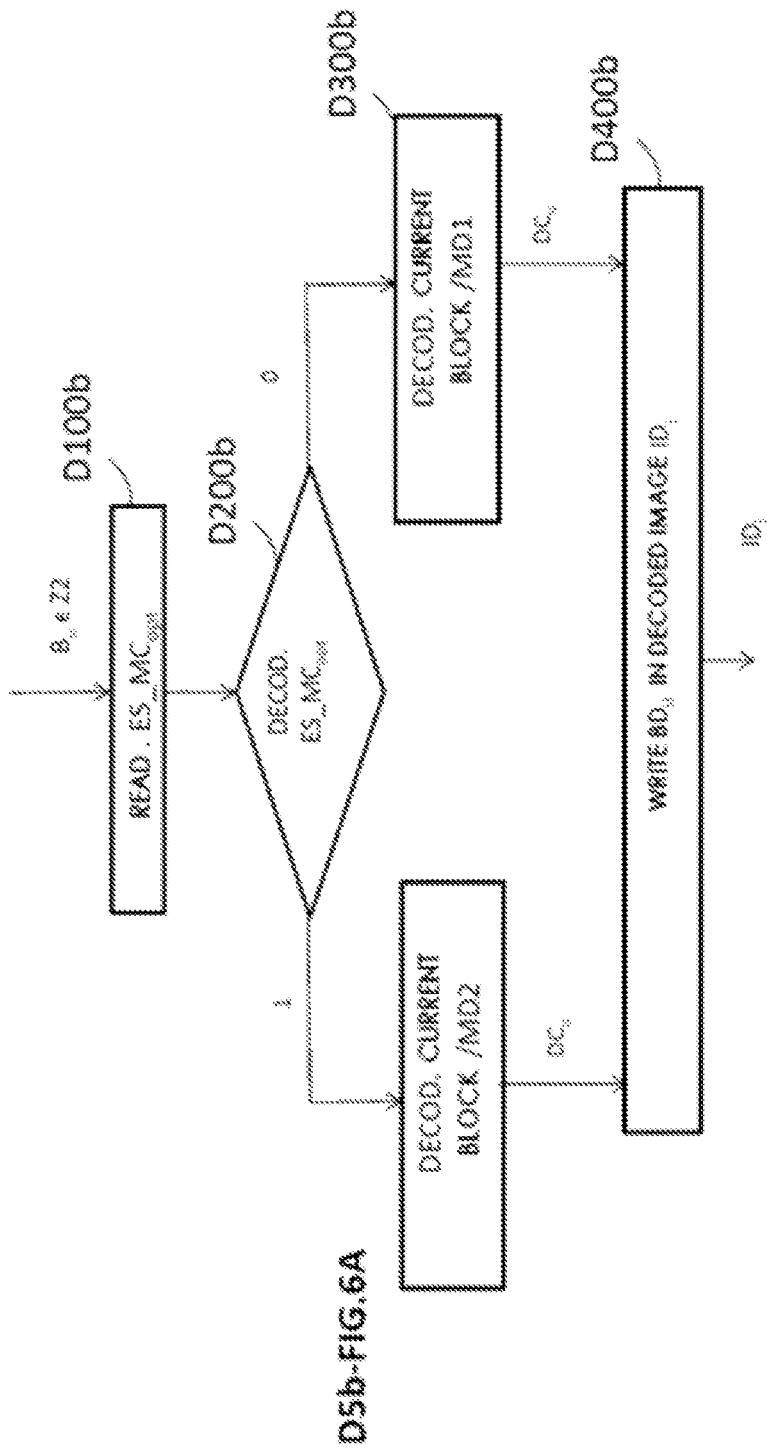

METHOD FOR ENCODING AND DECODING IMAGES, ENCODING AND DECODING DEVICE, AND CORRESPONDING COMPUTER PROGRAMS

CROSS-REFERENCE TO RELATED APPLICATIONS

This Application is a Section 371 National Stage Application of International Application No. PCT/FR2018/051579, filed Jun. 28, 2018, which is incorporated by reference in its entirety and published as WO 2019/008253 A1 on Jan. 10, 2019, not in English.

FIELD OF THE INVENTION

The present invention pertains generally to the field of image processing, and more precisely to the coding and to the decoding of parameters of digital images, whether these digital images are fixed or form part of a sequence of digital images.

The coding/decoding of such image parameters applies notably to images arising from at least one video sequence comprising:
 images arising from one and the same camera and following one another temporally (coding/decoding of 2D type),
 images arising from various cameras oriented according to different views (coding/decoding of 3D type),
 corresponding texture components and depth components (coding/decoding of 3D type),
 images obtained by projection of a 360° video,
 etc. . . . .

The present invention applies in a similar manner to the coding/decoding of parameters of images of 2D or 3D type.

The invention can notably, but not exclusively, apply to the video coding implemented in the current AVC (English abbreviation of "Advanced Video Coding") and HEVC (English abbreviation of "High Efficiency Video Coding") video coders and their extensions (MVC, 3D-AVC, MV-HEVC, 3D-HEVC, etc), and to the corresponding decoding.

BACKGROUND OF THE INVENTION

The current video coders (MPEG, H.264, HEVC, . . . ) use a block-wise representation of the video sequence. The images are split up into blocks, which might be split up again, for example in a recursive manner as in the HEVC standard.

For a current block to be coded, the image parameters associated with this block are coded in the form of bits with the aid of an adapted coding scheme implemented by a coder, such as for example an entropy coder whose aim is to code these parameters without loss.

Such parameters are for example:
 the residual prediction coefficients of the pixels of the current block,
 the mode of prediction of the current block (Intra prediction, Inter prediction, default prediction carrying out a prediction for which no information is transmitted to the decoder ("in English "skip")),
 information specifying the type of prediction of the current block (orientation, reference image, . . . ),
 the type of splitting of the current block,
 the motion information of the current block if necessary,
 etc.

The bits obtained after entropy coding are written into a data signal which is intended to be transmitted to the decoder.

Once the coded-data signal has been received by the decoder, the decoding is done image by image, and for each image, block by block. For each block, the bits representative of the image parameters associated with the block are read, and then decoded with the aid of a decoding scheme implemented by a decoder.

For each image type or format considered, a specific coding is implemented. Thus for example, the AVC and HEVC coders/decoders are adapted to code/decode 2D images arising from one and the same camera and following one another temporally. Such coders/decoders are also adapted to code/decode:
 images obtained by projection of a stereo video and each comprising two views representative of one and the same scene, which are intended to be looked at respectively through the left eye and the right eye of the user,
 images obtained by two-dimensional projection of a 360° stereo video, etc. . . . .

According to another example, the 3D-HEVC coders/decoders are adapted to code/decode 3D images, such as 3D images arising from various cameras oriented according to different views, corresponding texture components and depth components, images arising from a mono 360° video, etc. . . . .

By thus proposing a very specific type of coding/decoding for an image format or type considered, the coding/decoding performance obtained by current coders/decoders is not satisfactory.

The invention therefore envisages a coder/decoder which proposes to use two different coding/decoding schemes for a current image arising from a video content of a given type or format, while making it possible to optimize the coding/decoding performance for the current image.

SUBJECT AND SUMMARY OF THE INVENTION

One of the aims of the invention is to remedy drawbacks of the aforementioned prior art.

To this effect, a subject of the present invention relates to a method for coding an image split up into blocks, said image containing first and second distinct zones.

Such a coding method is noteworthy in that it implements the following, for at least one current block of the image:
 determine to which of the first and second zones the current block belongs,
 if the current block belongs to the first zone, code the current block with the aid of a first coding scheme,
 if the current block belongs to the second zone, code the current block with the aid of a second coding scheme which comprises the following:
  on the basis of the position of the current block in the second zone, identify a previously coded, and then decoded, block situated in the first zone of the image,
  copy the value of at least one coding parameter associated with the identified block.

Such a provision makes it possible within one and the same encoder to select a coding scheme which is best adapted to the way in which the scene that the image represents was initially captured.

For example, if the current image is a two-dimensional image, it is decided:
 in the case where this image originates from a video comprising 2D images following one another temporally, to select a first coding scheme implemented in the encoder, such as a conventional scheme of AVC or HEVC type;

in the case where this image was obtained by projection of a stereo video captured according to a plurality of angles of view covering for example an angle of 360°, this image being formed of two image zones corresponding to the left eye and to the right eye of the user, to select in the encoder either the first aforementioned coding scheme, or a second coding scheme depending on whether the current block is situated in the first zone or in the second zone of the image.

By virtue of the invention, it is thus possible to propose an adaptive coding of video contents which takes account of their format. Furthermore, for certain types of content format, the invention advantageously makes it possible to apply an adaptive coding to the current image according to the zone of the image to be coded at the current instant, at least one current block of a first zone being coded according to a first coding scheme, and at least one current block of a second zone of this image being coded according to a second coding scheme.

Advantageously, the second coding scheme used makes it possible to exploit the spatial correlations which exist between the second zone and the first zone of the current image, the value of at least one coding parameter of a block situated in the first zone being copied for a current block of the second zone. It is thus not necessary to code the value of such a coding parameter for the current block. This results in higher-performance coding of the image since it is more precise, less complex and less expensive in bitrate.

According to a particular embodiment, the second coding scheme is applied to all the blocks of the second zone of the current image.

Such a provision makes it possible to optimize the reduction in complexity and the reduction in cost in terms of bitrate of the coding implemented at the encoder.

According to another particular embodiment, the coding method implements the following:

code said at least one current block of the second zone of the image with the aid of the first coding scheme, select the first coding scheme or the second coding scheme in accordance with a predetermined coding performance criterion, code an item of information representative of said selection.

Having regard to the fact that the first and second coding schemes are set into competition, though the second coding scheme has been initially applied to the encoder at the current block, the coding method is rendered more flexible, thereby improving the efficiency of the coding.

According to yet another particular embodiment, the first and second zones of the image have the same shape, the first zone being situated above the second zone and separated from the latter by a horizontal boundary extending along the middle of the image.

Such a spatial arrangement of the first and second zones of the current image makes it possible to optimize coding performance, by precisely predefining the location of an already coded and then decoded block of the first zone of the image, as a function of the position of the current block of the second zone.

The various aforementioned modes or characteristics of embodiment can be added independently or in combination with one another, to the operations implemented in the course of the coding method such as is defined hereinabove.

Correlatively, the invention relates to a device for coding at least one image split up into blocks, said image containing first and second distinct zones.

Such a coding device is noteworthy in that it comprises a processing circuit which is designed to implement the following, for at least one current block of the image:

determine to which of the first and second zones the current block belongs, if the current block belongs to the first zone, code the current block with the aid of a first coding scheme, if the current block belongs to the second zone, code the current block with the aid of a second coding scheme which comprises the following:

on the basis of the position of the current block in the second zone, identify a previously coded, and then decoded, block situated in the first zone of the image, copy the value of at least one coding parameter associated with the identified block.

In a corresponding manner, the invention also relates to a method for decoding a data signal representative of an image split up into blocks which has been coded, said at least one image containing first and second distinct zones.

Such a decoding method is noteworthy in that it implements the following, for at least one current block to be decoded of the image:

determine to which of the first and second zones the current block belongs, if the current block belongs to the first zone, decode the current block with the aid of a first decoding scheme, if the current block belongs to the second zone, decode the current block with the aid of a second decoding scheme which comprises the following:

on the basis of the position of the current block in the second zone, identify a previously decoded block, situated in the first zone of the image, assign to the current block at least one decoding parameter associated with said identified block.

According to a particular embodiment, the second decoding scheme is applied to all the blocks of the second zone of the current image.

According to another particular embodiment, the second decoding scheme is applied to the current block of the second zone if, for the current block, an item of information in respect of selection of the second decoding scheme is read in the data signal, the first decoding scheme being applied to the current block of the second zone if, for the current block, an item of information in respect of selection of said first decoding scheme is read in the data signal.

According to yet another particular embodiment, the first and second zones of the image have the same shape, the first zone being situated above the second zone and separated from the latter by a horizontal boundary extending along the middle of the image.

The various aforementioned modes or characteristics of embodiment can be added independently or in combination with one another, to the operations implemented in the course of the decoding method such as is defined hereinabove.

Correlatively, the invention relates to a device for decoding a data signal representative of an image split up into blocks which has been coded, said at least one image containing first and second distinct zones.

Such a decoding device is characterized in that it comprises a processing circuit which is designed to implement the following, for at least one current block to be decoded of the image:

determine to which of the first and second zones the current block belongs, if the current block belongs to the first zone, decode the current block with the aid of a first decoding scheme, if the current block belongs to the second zone, decode the current block with the aid of a second decoding scheme which comprises the following:

on the basis of the position of the current block in the second zone, identify a previously decoded block, situated in the first zone of the image, assign to the current block at least one decoding parameter associated with said identified block.

The invention further relates to a computer program comprising instructions for implementing one of the coding and decoding methods according to the invention, when it is executed on a computer.

Such a program can use any programming language, and be in the form of source code, object code, or of code intermediate between source code and object code, such as in a partially compiled form, or in any other desirable form.

Yet another subject of the invention also envisages a recording medium readable by a computer, and comprising computer program instructions, such as mentioned hereinabove.

The recording medium can be any entity or device capable of storing the program. For example, the medium can comprise a storage means, such as a ROM, for example a CD ROM or a microelectronic circuit ROM, or else a magnetic recording means, a digital recording means, for example a USB key or a hard disk.

Moreover, such a recording medium can be a transmissible medium such as an electrical or optical signal, which can be conveyed via an electrical or optical cable, by radio or by other means. The program according to the invention can in particular be downloaded over a network of Internet type.

Alternatively, such a recording medium can be an integrated circuit in which the program is incorporated, the circuit being adapted to execute the method in question or to be used in the execution of the latter.

BRIEF DESCRIPTION OF THE DRAWINGS

Other characteristics and advantages will become apparent on reading preferred embodiments described with reference to the figures in which:

FIG. 1B represents the progress of the coding method according to a second embodiment of the invention, FIG. 4 represents an exemplary conventional coding scheme implemented in the methods of coding of FIGS. 1A and 1B, FIGS. 5A and 5B each represent two different examples of identification of a reference block in a current image, during the application to the current block of a coding or decoding scheme according to the invention, such as implemented in the methods of coding of FIGS. 1A and 1B or in the methods of decoding of FIGS. 6A and 6B, FIG. 6B represents the progress of the decoding method according to a second embodiment of the invention.

DETAILED DESCRIPTION OF THE CODING PART

A first embodiment of the invention will now be described, in which the coding method according to the invention is used to code an image or a sequence of images according to a binary stream close to that obtained by a coding implemented in a coder complying with any one of the current or forthcoming video coding standards.

In this embodiment, the coding method according to the invention is for example implemented in a software or hardware manner by modifications of such a coder. The coding method according to the first embodiment of the invention is represented in the form of an algorithm comprising operations C1 to C6a) or C1 to C6b) such as are represented in FIG. 1A.

Figure 2A:
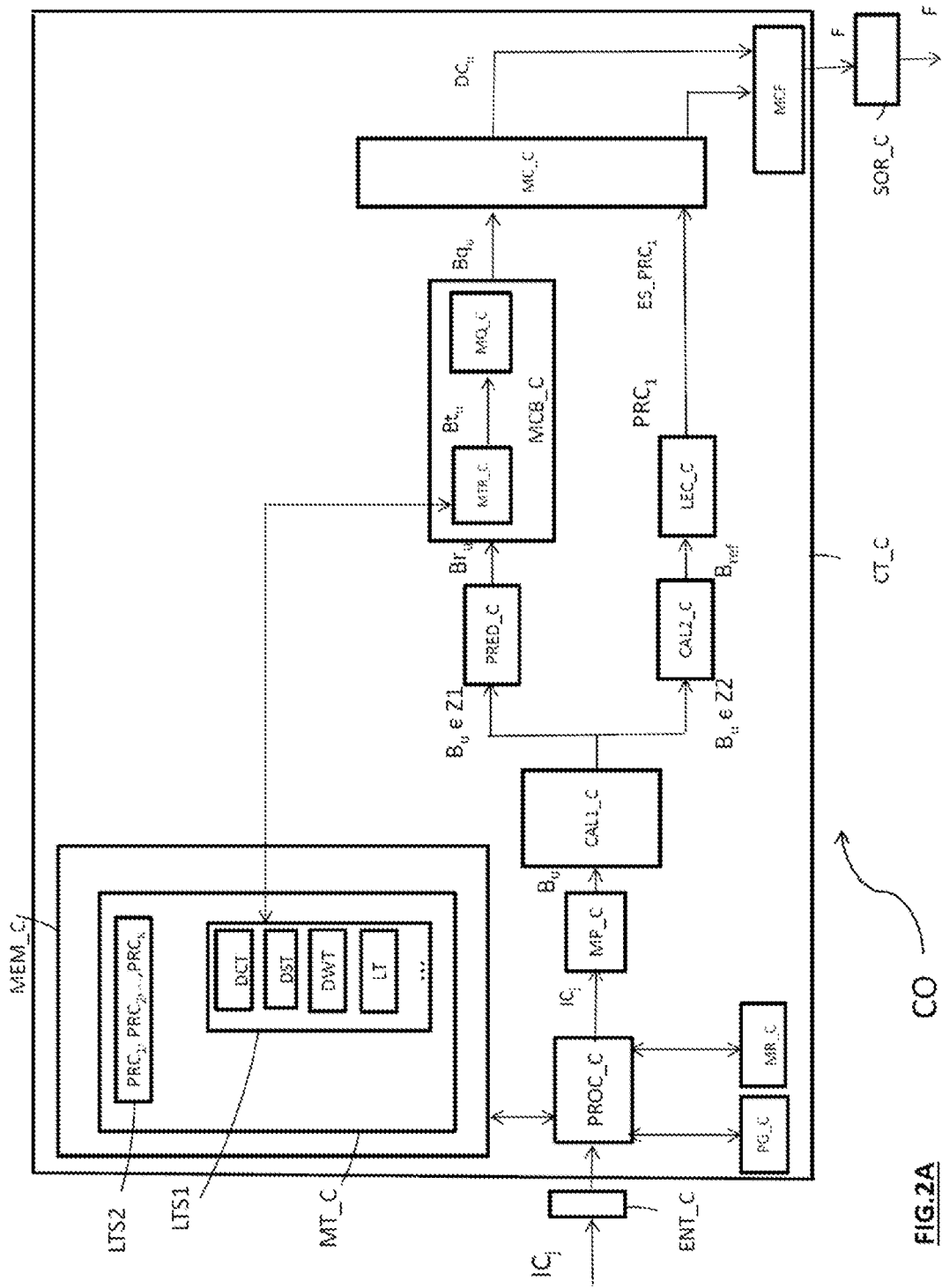
FIG. 2A represents a coding device according to a first embodiment of the invention.

According to the first embodiment of the invention, the coding method is implemented in a coding device or coder CO represented in FIG. 2A.

As illustrated in FIG. 2A, the coder CO comprises a memory MEM_C comprising a buffer memory MT_C, a processor PROC_C driven by a computer program PG_C which implements the coding method according to the invention. On initialization, the code instructions of the computer program PG_C are for example loaded into a RAM memory, denoted MR_C, before being executed by the processor PROC_C.

Figure 1A:
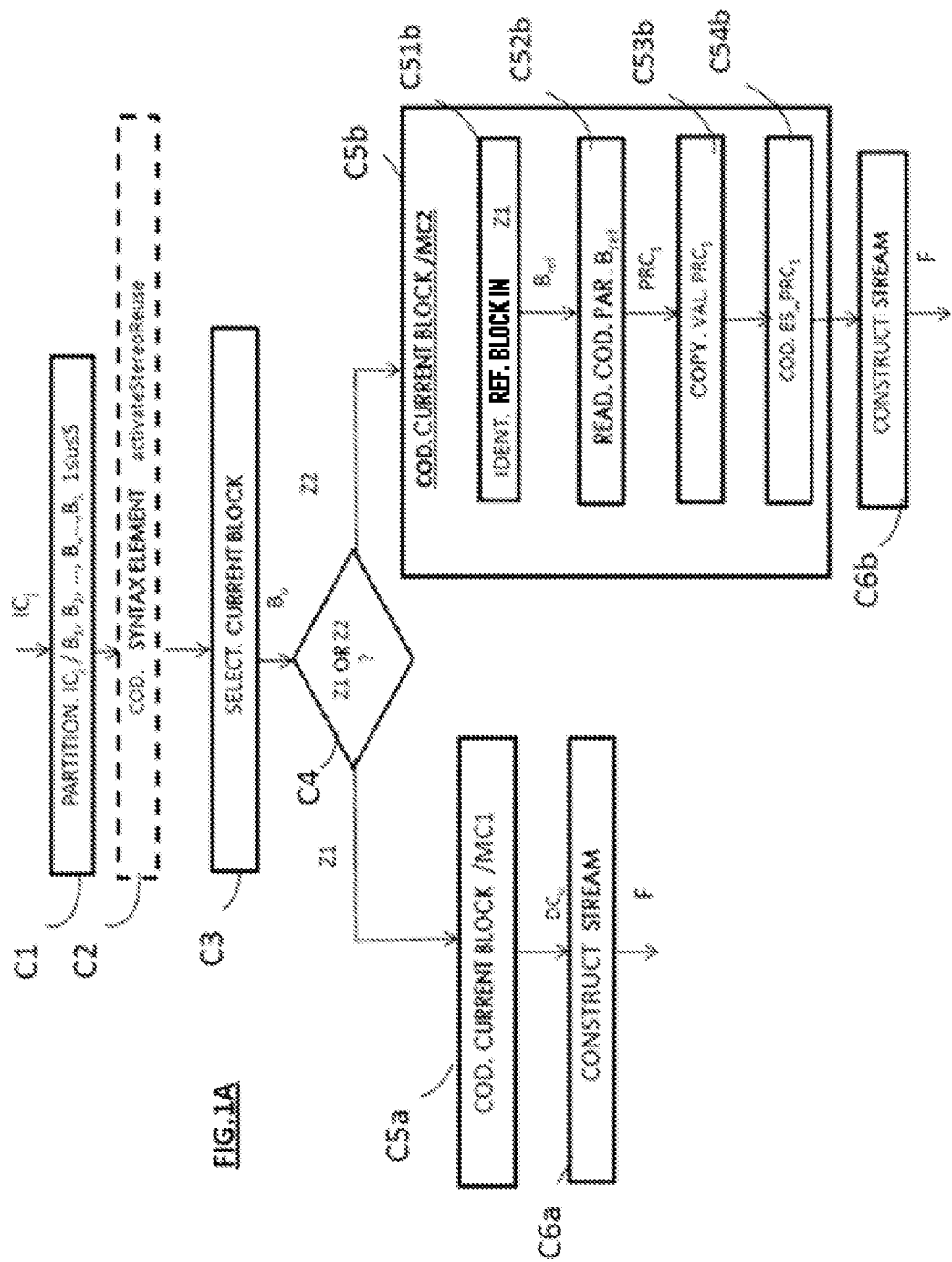
FIG. 1A represents the progress of the coding method according to a first embodiment of the invention.

The coding method represented in FIG. 1A applies to any current image $IC_j$ which is fixed or else which forms part of a sequence of L images $IC_1, \ldots, IC_j, \ldots, IC_L$ ($1 \leq j \leq L$) to be coded.

The current image $IC_j$ arises from at least one video sequence comprising, by way of non-exhaustive examples:

images arising from one and the same camera and following one another temporally (coding/decoding of 2D type), images arising from various cameras oriented according to different views (coding/decoding of 3D type), corresponding texture components and depth components, that is to say which are representative of one and the same scene (coding/decoding of 3D type), images obtained by projection of a mono 360° video, images obtained by projection of a stereo video and each comprising at least two views representative of one and the same scene, non-natural images of the "screen Content" type, such as for example images obtained by screen video capture, etc. . . . .

With reference to FIG. 1A, there is undertaken at C1, in a manner known per se, the splitting of a current image $IC_j$ into a plurality of blocks $B_1, B_2, \ldots, B_u, \ldots, B_S$ ($1 \leq u \leq S$). The partitioning is implemented by a partitioning device MP_C represented in FIG. 2A, which device is driven by the processor PROC_C.

It should be noted that within the meaning of the invention, the term "block" signifies coding unit. The latter terminology is used notably in the HEVC standard "ISO/

IEC/23008-2 Recommendation ITU-T H.265 High Efficiency Video Coding (HEVC)".

In particular, such a coding unit groups together sets of pixels of rectangular or square shape, also called blocks, macroblocks, or else sets of pixels exhibiting other geometric shapes.

Said blocks $B_1, B_2, \ldots, B_u, \ldots, B_S$ are intended to be coded according to a predetermined order of traversal, which is for example of the lexicographic type. This signifies that the blocks are coded one after the other, from left to right.

Other types of traversal are of course possible. Thus, it is possible to split the image $IC_j$ into several sub-images called slices and to apply a splitting of this type independently to each sub-image. It is also possible to code not a succession of lines, as explained hereinabove, but a succession of columns. It is also possible to traverse the lines or columns in either direction.

According to an example, the blocks $B_1, B_2, \ldots, B_u, \ldots, B_S$ have a square shape and all contain K pixels, with K≤1. By way of non-exhaustive example, the blocks have a size of 64×64 pixels and/or 32×32 and/or 16×16 and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

In an optional manner, as represented dashed in FIG. 1A, there is undertaken at C2 the coding of a syntax element activateStereoReuse which is associated with a characteristic of the current image $IC_j$.

The syntax element activateStereoReuse is a high-level syntax element of a video sequence comprising the current image $IC_j$. To this effect, as a function of the coding context, this element can be coded:
  at the start of the coding of each image of the video sequence,
  or just once at the start of the coding of a sequence of images,
  or just once at the start of the coding of the video sequence.

The syntax element activateStereoReuse is intended to indicate the type of format of current image to be coded. According to a preferred embodiment, the syntax element activateStereoReuse is coded to the value 1 if the current image to be coded has been obtained by projection of a stereo video, 360°, 180° or other, and if the current image is composed of several views captured at the same temporal instant and arranged in the current image so as to form a single view (rectangle of pixels). A method for composing such an image uses for example the technique called "Frame Packing" (FP). The syntax element activateStereoReuse is on the other hand coded to the value 0 if the current image to be coded is of 2D type or else has been obtained by projection of a mono video, 360°, 180° or other.

The coding C2 is for example an entropy coding of CABAC ("Context Adaptive Binary Arithmetic Coding" in English) type or else an entropy coding of arithmetic or Huffman type. This coding is implemented by a coding device MC_C represented in FIG. 2A, which device is driven by the processor PROC_C.

Such a coding C2 is not necessary in the case where the coder CO makes a distinction in an autonomous manner between:
  a current image to be coded of 2D type or else obtained by projection of a mono video, 3600, 180° or other,
  and a current image to be coded obtained by projection of a stereo video, 360°, 180° or other, and composed according to a technique of FP type.

In the subsequent description, it is considered that the current image to be coded has been obtained by projection of a stereo video, 360°, 180° or other, and that the current image is composed of several views captured at the same temporal instant and arranged in the current image so as to form a single view (rectangle of pixels).

With reference to FIG. 1A, the coder CO of FIG. 2A selects at C3 a current block to be coded $B_u$ of the image $IC_j$.

At C4, there is undertaken the location of the current block $B_u$ of the image $IC_j$ for example by determining its coordinates with respect to the first pixel situated at the top left of the image $IC_j$, and which has coordinates (0,0). The effect of such location is to determine whether the current block belongs to a first zone or a second zone of the current image $IC_j$, the first and second zones being distinct. According to the invention, the first and second zones are distinct, in the sense that they do not overlap.

The location C4 is implemented by a calculation device CAL1_C such as represented in FIG. 2A, which device is driven by the processor PROC_C.

According to a first embodiment represented in FIG. 3A, which is the preferred embodiment, a current image $IC_j$ comprises a first zone Z1 which extends over the top half of the image and a second zone Z2 which extends over the bottom half of the image. The zones Z1 and Z2 have the same shape and are separated from one another by a horizontal boundary FH extending along the middle of the image.

According to a second embodiment represented in FIG. 3B, a current image $IC_j$ comprises a first zone Z1 which extends over the left half of the image and a second zone Z2 which extends over the right half of the image. The zones Z1 and Z2 have the same shape and are separated from one another by a vertical boundary FV extending along the middle of the image.

According to a third embodiment represented in FIG. 3C, a current image $IC_j$ comprises a first zone Z1 which extends over the first upper left quarter of the image and a second zone Z2 which extends over the second upper left quarter of the image. The zones Z1 and Z2 have the same shape and are separated from one another by a horizontal boundary FH extending over a quarter of the image.

Other configurations are of course possible. For example, the zones Z1 and Z2 may be swapped. Furthermore the zones Z1 and Z2 may or may not have the same shape.

If the current block $B_u$ belongs to the first zone Z1 of the image $IC_j$, with reference to FIG. 1A, there is undertaken at C5a) the coding of the current block with the aid of a first coding scheme MC1. The first coding scheme MC1 is a conventional scheme, an example of which is illustrated in FIG. 4. The coding scheme MC1 is applied to any current block of the zone Z1.

With reference to FIG. 4, a conventional coding scheme MC1 such as this implements a prediction C51a) of the current block $B_u$ by conventional prediction techniques, for example Intra and/or Inter and/or skip and/or Merge, etc. . . . . To this effect, the current block $B_u$ is predicted with respect to at least one predictor block in accordance with a mode of prediction belonging to one of the prediction techniques which have just been mentioned.

In a manner known per se, the current block $B_u$ is predicted with respect to a plurality of candidate predictor blocks. Each of the candidate predictor blocks is a block of pixels which has been already coded and then decoded.

On completion of the prediction C51a), an optimal predictor block $BP_{opt}$ is obtained subsequent to a setting into competition of said predetermined prediction techniques, according to a predetermined coding performance criterion, for example by minimizing a distortion bitrate criterion well known to the person skilled in the art. The block $BP_{opt}$ is considered to be an approximation of the current block $B_u$. The information relating to this prediction is intended to be written, in the form of syntax elements, into a data signal or stream to be transmitted to a decoder.

There is thereafter undertaken conventionally at C52a) the comparison of the data relating to the current block $B_u$ with the data of the predictor block $BP_{opt}$. Such a comparison consists in calculating the difference between the predictor block obtained $BP_{opt}$ and the current block $B_u$.

A data set, called residual block $Br_u$, is then obtained.

The operations C51a) and C52a) are implemented by a predictive coding device PRED_C represented in FIG. 2A, which device is driven by the processor PROC_C.

With reference again to FIG. 4, the data of the current residual block $Br_u$ are coded at C53a) in a conventional manner.

According to a nonlimiting exemplary embodiment, such a coding C53a) implements the application C531a) of a transform to the pixels of the current residual block $Br_u$.

In a manner known per se, as a function of the context or of the coding standard used, such a transform is for example a transform of DCT (English abbreviation of "Discrete Cosine Transform"), DST (English abbreviation of "Discrete Sine Transform") type, of DWT (English abbreviation of "Discrete Wavelet Transform") type or else of LT (English abbreviation of "Lapped Transform") type. These transforms are stored previously in a list LTS1, in the buffer memory MT_C of the coder CO of FIG. 2A.

On completion of the application of this transform, a current transformed data block $Bt_u$ is obtained.

Such an operation is performed by a transform calculation device MTR_C, such as represented in FIG. 2A, which device is driven by the processor PROC_C.

The coding C53a) furthermore implements a quantization C532a) of the data of the transformed block $Bt_u$ according to a conventional quantization operation, such as for example a scalar or vector quantization. A block $Bq_u$ of quantized coefficients is then obtained.

The quantization C532a) is implemented by a quantization device MQ_C such as represented in FIG. 2A, which device is driven by the processor PROC_C.

The transform calculation device MTR_C and the quantization device MQ_C are contained in a device for coding blocks MCB_C which is represented in FIG. 2A, which device is driven by the processor PROC_C.

The coding C53a) furthermore implements a coding C533a) of the data of the block $Bq_u$ of quantized coefficients. The coding C533a) is implemented by the coding device MC_C of FIG. 2A. A set of coded data $DC_u$ of the current block $B_u$ is obtained on completion of the coding C53a).

With reference to FIG. 1A, there is undertaken at C6a) the construction of a signal portion F which conventionally contains:
- the coded data $DC_u$ obtained at C5a),
- certain information encoded by the coder CO, such as for example:
  - the type of prediction, Inter, Intra, skip or Merge applied to the current block $B_u$, and if relevant, the prediction mode selected, the index of the predictor block obtained
  - the type of partitioning of the current block $B_u$ if the latter has been partitioned,
  - the type of transform applied to the data of the current block $B_u$,
- etc. . . . . .

In accordance with the invention, the stream F optionally contains the value 0/1 of the syntax element activateStereoReuse, if the latter is coded at the image level.

The construction of the stream F is implemented by a data signal construction device MCF, such as represented in FIG. 2A.

If on completion of the location C4, the current block $B_u$ belongs to the second zone Z2 of the image $IC_j$, there is undertaken at C5b) the coding of the current block with the aid of a second coding scheme MC2. According to the first embodiment, the second coding scheme MC2 is applied to any current block situated in the second zone Z2.

According to the invention, with reference to FIG. 1A, there is undertaken at C51b) the identification of a reference block $B_{ref}$ which has been previously coded, and then decoded, and which is situated in the first zone Z1 of the current image $IC_j$.

The identification C51b) is implemented by a calculation device CAL2_C such as represented in FIG. 2A, which device is driven by the processor PROC_C.

According to a preferred embodiment, if the current block which has been located in the second zone Z2 has its first pixel at the top left which has coordinates $(x_u, Y_u)$ in the current image $IC_j$, then a reference block $B'_{ref}$ is determined in the first zone Z1, as being the block whose first pixel $p'_{ref}$ at the top left has coordinates $(x'_{ref}, y'_{ref})$, such that $x'_{ref}=x_u$ and $y'_{ref}=y_u-h/2$, where h is the height of the current image $IC_j$.

Figure 5B:
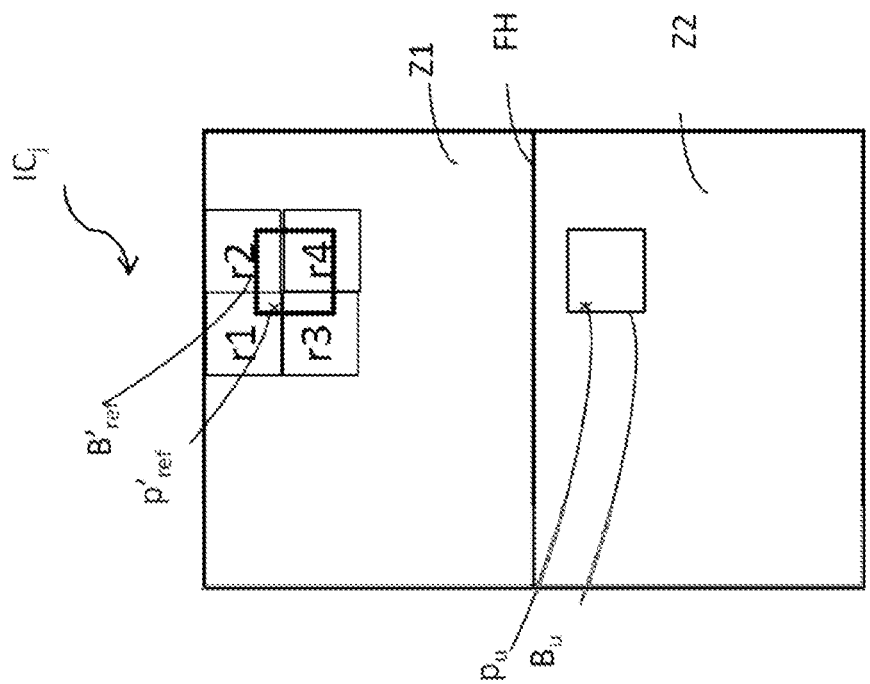
Figure 5A:
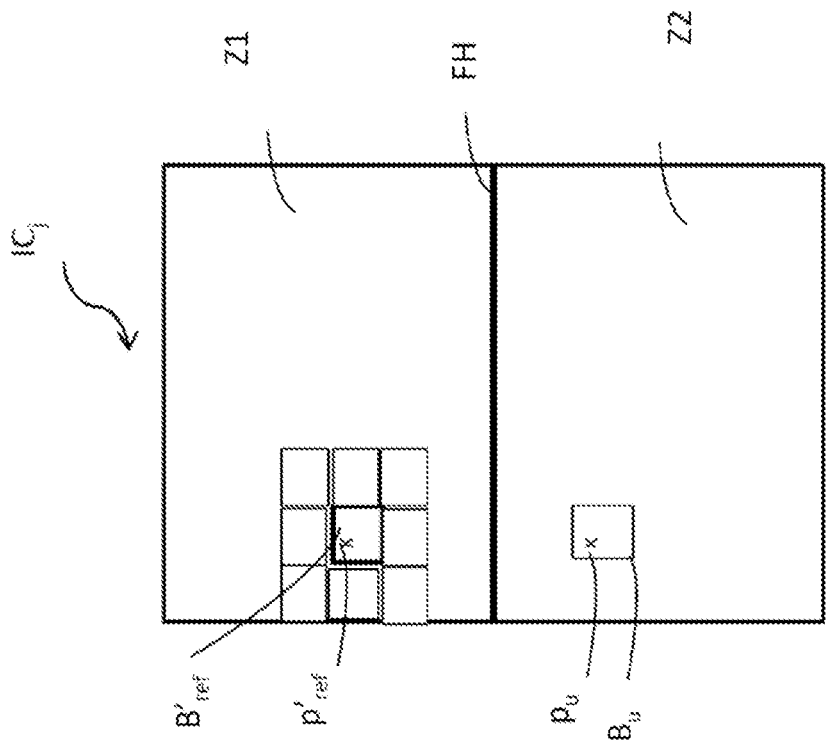

FIG. 5A represents an example of such a determination, in the case where the reference block $B'_{ref}$ which is determined does not overlap other neighboring reference blocks in the first zone Z1 of the current image $IC_j$ which is for example similar to that illustrated in FIG. 3A. In FIG. 5A, the neighboring reference blocks are those represented with points. According to such a configuration, the block $B'_{ref}$ is then considered to be the identified block $B_{ref}$.

FIG. 5B represents another example of such a determination, in the case where the reference block $B'_{ref}$ which is determined overlaps other neighboring reference blocks r1, r2, r3, r4 in the first zone Z1 of the current image $IC_j$ which is for example similar to that illustrated in FIG. 3A. According to such a configuration, in accordance with an exemplary embodiment, it is determined which, among the neighboring reference blocks r1, r2, r3, r4, is the one that has the most pixels in common with the block $B'_{ref}$. In FIG. 5B, it is the reference block r4 which is then considered to be the identified block $B_{ref}$.

Of course, there exist other schemes for selecting the neighboring reference block, when the block $B'_{ref}$ overlaps neighboring reference blocks in the first zone Z1 of the current image $IC_j$.

According to another example, in the case of FIG. 5B, it could be determined which, among the neighboring reference blocks r1, r2, r3, r4, is the one that contains the center of the block $B'_{ref}$.

According to yet another exemplary embodiment, the reference block $B'_{ref}$ is determined in the first zone Z1, as being the block which contains the pixel with coordinates $x'_{ref}=x_c$ and $y'_{ref}=y_c-h/2$, where $(x_c, y_c)$ are the coordinates of the center of the current block.

The reference block $B_{ref}$ having been identified in the first zone Z1, with reference to FIG. 1A, there is undertaken at C52b) the reading of at least one coding parameter $PRC_1$ associated with the reference block $B_{ref}$. Such a coding parameter $PRC_1$ is stored in a list LST2 of the buffer memory MT_C of the coder of FIG. 2A.

The reading C52b) is implemented by a reading device LEC_C such as represented in FIG. 2A, which device is driven by the processor PROC_C.

By way of non-exhaustive examples, the list LST2 contains a number K of coding parameters $PRC_1$, $PRC_2$, ..., $PRC_K$ associated with the identified reference block $B_{ref}$, among which are:

- the type of prediction intra, inter, skip, merge, etc. . . . chosen to predict the block $Bre_f$,
- the direction of intra prediction which has been selected if the intra prediction has been applied to the block $B_{ref}$ during the coding of the latter,
- the index of the motion vector if the prediction applied to the block $B_{ref}$ is of inter type,
- the nullity of the residual of the prediction applied to the block $B_{ref}$ during the coding of the latter,
- the type of partitioning applied to the block $B_{ref}$ during the coding of the latter,
- the type of transformation chosen,
- the value of the quantization interval chosen,
- the type of filtering applied to the block $B_{ref}$, such as for example the SAO ("Sample Adaptive Offset") mode used in the HEVC standard,
- etc. . . . .

In the course of the reading C52b), one or more of the aforementioned coding parameters associated with the block $B_{ref}$ may thus be read.

With reference to FIG. 1A, there is undertaken, at C53b), the copying, for the current block, of the value of a coding parameter $PRC_1$ read at C52b). It is thus advantageously not necessary to code the coding parameter $PRC_1$.

According to one embodiment, there is undertaken at C54b) the coding of a syntax element $ES\_PRC_1$ which indicates whether or not the coding parameter $PRC_1$ of the reference block $B_{ref}$ is a parameter whose value has been copied for the current block.

The coding C54b) is for example an entropy coding of CABAC type or else an entropy coding of arithmetic or Huffman type. This coding is implemented by the coding device MC_C of FIG. 2A.

For example, the syntax element $ES\_PRC_1$ is coded:
- to the value 1 to indicate that the value of the coding parameter $PRC_1$ has been copied for the current block,
- to the value 0 to indicate that the value of the coding parameter $PRC_1$ has not been copied for the current block and has therefore been coded conventionally.

In the case where the syntax element $ES\_PRC_1$ is coded to the value 0, the coding parameter $PRC_1$ is coded in a conventional manner.

According to one embodiment, in the course of the coding C54b), K syntax elements $ES\_PRC_1$, $ES\_PRC_2$, ..., $ES\_PRC_K$ are coded, these indicating whether or not each of the coding parameters $PRC_1$, $PRC_2$, ..., $PRC_K$ associated with the reference block $B_{ref}$ is a parameter whose value has been copied for the current block.

Of course, it may be decided to code only some of the K syntax elements hereinabove. According to one embodiment, by assuming that the syntax element activateStereoReuse has been coded at C2 to the value 1, the binary sequence 1101 signifies for example that:
- the syntax element activateStereoReuse has been coded at C2 to the value 1,
- the value of the type of partitioning which has been applied to the reference block $B_{ref}$ has been copied for the current block,
- the value of the type of transform which has been applied to the reference block $B_{ref}$ has not been copied for the current block, the type of transform applied to the current block then being coded in a conventional manner,
- the value of the quantization interval used during the coding of the reference block $B_{ref}$ has been copied for the current block.

With reference to FIG. 1A, the device MCF of FIG. 2A undertakes at C6a) the construction of a signal portion F which contains, according to the invention, the value 0/1 of said at least syntax element $ES\_PRC_1$.

The signal portion F also contains all the data of the current block which have been coded in a conventional manner.

In accordance with the invention, the stream F optionally contains the value 0/1 of the syntax element activateStereoReuse, if the latter is coded at the image level.

The data signal F is thereafter transmitted by a communication network (not represented) to a remote terminal. The latter comprises the decoder DO represented in FIG. 7A.

According to the first embodiment which has just been described with reference to FIG. 1A:
- the coding operations C1 to C6a) are implemented for each block of the first zone Z1 of the current image $IC_j$,
- the coding operations C1 to C6b) are implemented for each block of the second zone Z2 of the current image $IC_j$.

We shall now describe a second embodiment of the coding method according to the invention, with reference to FIG. 1B.

Figure 2B:
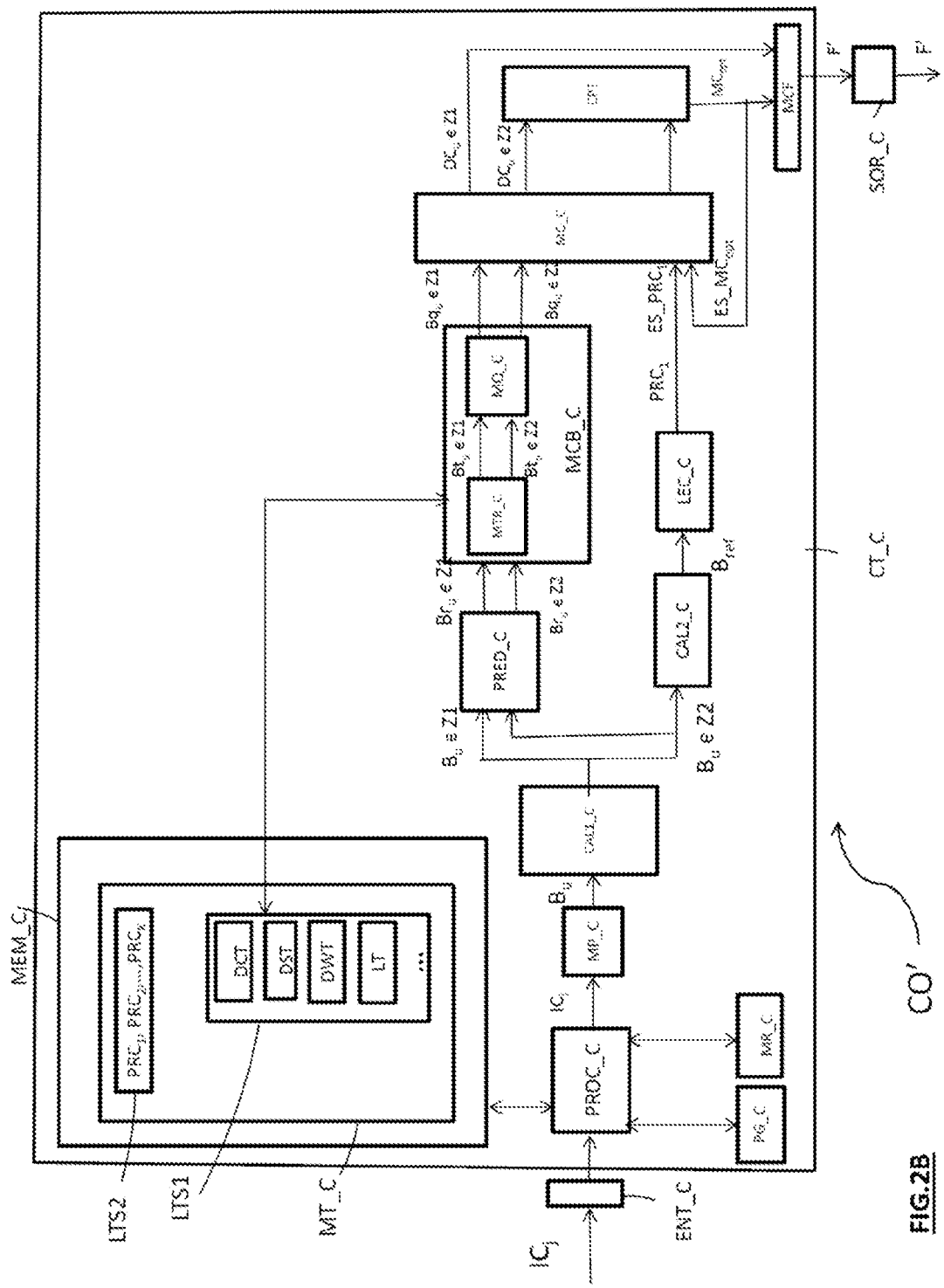
FIG. 2B represents a coding device according to a second embodiment of the invention, FIGS. 3A to 3C each represent examples of distinct zones in the current image to be coded or to be decoded.

According to this second embodiment of the invention, the coding method is implemented in a coding device or coder CO' represented in FIG. 2B which comprises elements similar to those of the coder CO of FIG. 2A. For reasons of simplification, similar elements such as these are repeated in FIG. 2B with the same references as in FIG. 2A.

According to the second embodiment, the first coding scheme MC1 is applied to any current block situated in the first zone Z1, exactly in the same way as in the first embodiment of FIG. 1A. This second embodiment is distinguished from that of FIG. 1A by the fact that, with reference to FIG. 1B, in addition to the coding C5b) implemented for the current block located in the second zone Z2, there is undertaken at C100b) the coding of the current block $B_u$ with the aid of the first coding scheme MC1 applied to any block of the first zone Z1 of the current image, such as for example the coding scheme represented in FIG. 4. Such a coding 100b) is implemented by the predictive coding device PRED_C, the device for coding blocks MCB_C and the coding device MC_C which are illustrated in FIG. 2B.

With reference to FIG. 1B, the coding schemes MC1 and MC2 applied to the current block, respectively at C5b) and at C100b) are set into competition at C200b), according to a predetermined coding performance criterion, for example by minimizing a distortion bitrate criterion well known to the person skilled in the art.

The setting into competition C200b) is implemented by a calculation device CPT such as represented in FIG. 2B, which device is driven by the processor PROC_C.

On completion of the setting into competition C200b), an optimal coding scheme $MC_{opt}$ is obtained, such that $MC_{opt}=MC1$ or $MC_{opt}=MC2$. A syntax element $ES\_MC_{opt}$ is then coded at C300b).

The coding C300b) is for example an entropy coding of CABAC type or else an entropy coding of arithmetic or Huffman type. This coding is implemented by the coding device MC_C of FIG. 2B.

For example, the syntax element $ES\_MC_{opt}$ is coded:
- to the value 0 to indicate that the current block $B_u$ of the second zone Z2 is coded using the first conventional coding scheme MC1 selected subsequent to the setting into competition C200b),
- to the value 1 to indicate that the current block $B_u$ of the second zone Z2 is coded using the second coding scheme MC2 according to the invention, selected subsequent to the setting into competition C200b).

With reference to FIG. 1B, the device MCF of FIG. 2B undertakes at C400b) the construction of a signal portion F' which contains:
- if the first conventional coding scheme MC1 has been selected subsequent to the setting into competition C200b):
  - the coded data $DC_u$ obtained at C100b),
  - certain information encoded by the coder CO', such as for example:
    - the type of prediction Inter, Intra, skip or merge applied to the current block $B_u$, and if relevant, the prediction mode selected, the index of the predictor block obtained
    - the type of partitioning of the current block $B_u$ if the latter has been partitioned,
    - the type of transform applied to the data of the current block $B_u$,
    - etc. . . . .
- if the second coding scheme MC2 according to the invention has been selected subsequent to the setting into competition C200b):
  - the value 0/1 of said at least syntax element $ES\_PRC_1$,
  - all the data of the current block which have been coded in a conventional manner.

The signal portion F' is thereafter transmitted by a communication network (not represented) to a remote terminal. The latter comprises the decoder DO represented in FIG. 7B.

According to the second embodiment of the coding method which has just been described:
- the coding operations C1 to C6a) are implemented for each block of the first zone Z1 of the current image $IC_j$,
- the coding operations C1 to C400b) are implemented for each block of the second zone Z2 of the current image $IC_j$.

Detailed Description of the Decoding Part

A first embodiment of the invention will now be described, in which the decoding method according to the invention is used to decode a data signal or stream representative of an image or of a sequence of images which is able to be decoded by a decoder complying with any one of the current or forthcoming video decoding standards.

In this embodiment, the decoding method according to the invention is for example implemented in a software or hardware manner by modifications of such a decoder.

Figure 6A:
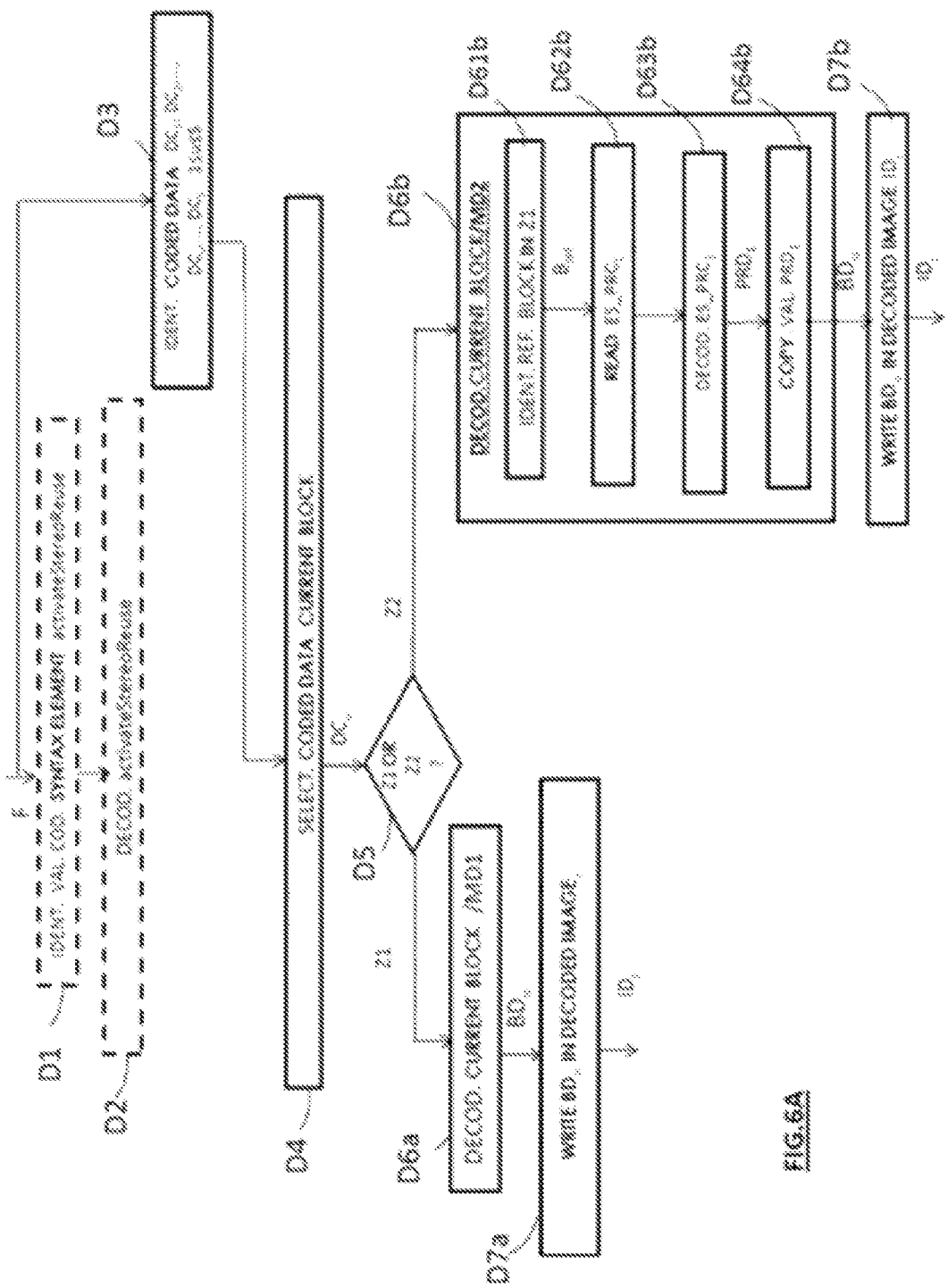
FIG. 6A represents the progress of the decoding method according to a first embodiment of the invention.

The decoding method according to the first embodiment of the invention is represented in the form of an algorithm comprising operations D1 to D7a) or D1 to D7b) such as represented in FIG. 6A.

Figure 7A:
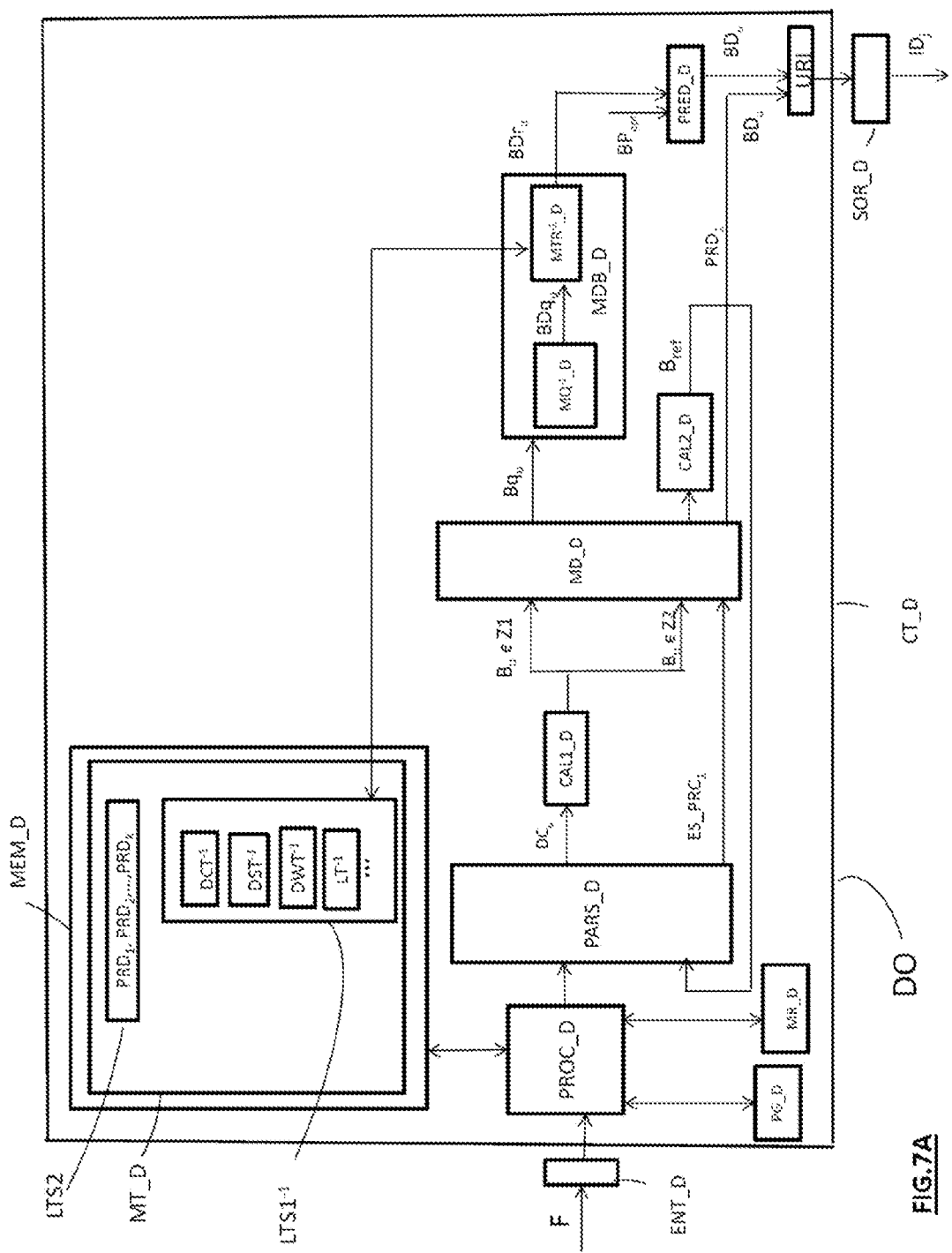
FIG. 7A represents a decoding device according to a first embodiment of the invention.

According to this first embodiment, the decoding method according to the invention is implemented in a decoding device or decoder DO represented in FIG. 7A.

As illustrated in FIG. 7A, according to the first embodiment of the invention, the decoder DO comprises a memory MEM_D which itself comprises a buffer memory MT_D, a processor PROC_D driven by a computer program PG_D which implements the decoding method according to the invention. On initialization, the code instructions of the computer program PG_D are for example loaded into a RAM memory denoted RAM_D, before being executed by the processor PROC_D.

The decoding method represented in FIG. 6A applies to any coded current image $IC_j$ which is fixed or else which forms part of a sequence of L images $IC_1, \ldots, IC_j, \ldots, IC_L$ ($1 \leq j \leq L$) to be decoded.

The current image $IC_j$ to be decoded arises from at least one video sequence comprising, by way of non-exhaustive examples:
- images arising from one and the same camera and following one another temporally (coding/decoding of 2D type),
- images arising from various cameras oriented according to different views (coding/decoding of 3D type),
- corresponding texture components and depth components, that is to say which are representative of one and the same scene (coding/decoding of 3D type),
- images obtained by projection of a mono 360° video,
- images obtained by projection of a stereo video and each comprising two views representative of one and the same scene, which are intended to be looked at respectively through the left eye and the right eye of the user,
- non-natural images of the "screen Content" type, such as for example the images obtained by screen video capture,
- etc. . . . .

In an optional manner, as represented dashed in FIG. 6A, there is undertaken at D1 the reading, in the data signal F, of the coded value 0 or 1 of the syntax element activateStereoReuse which is associated with a characteristic of the current image $IC_j$ to be decoded. The reading D1 is implemented only in the case where this syntax element has been coded at the level of the current image $IC_j$.

According to a preferred embodiment, the syntax element activateStereoReuse which is read takes for example:
- the value 1 if the current image to be coded has been obtained by projection of a stereo video, 360°, 180° or other, and if the current image to be decoded has been composed according to the aforementioned FP technique,
- the value 0 if the current image to be decoded is of 2D type or else has been obtained by projection of a mono video, 360°, 180° or other.

The reading D1 is implemented by a stream analysis device PARS_D, such as represented in FIG. 7A, said device being driven by the processor PROC_D.

In case of identification, with reference to FIG. 6A, there is undertaken at D2, the decoding of the coded value 0 or 1 taken by the syntax element activateStereo Reuse.

Such a decoding D2 is implemented by a decoding device MD_D represented in FIG. 7A, which device is driven by the processor PROC_D.

The decoding is for example an entropy decoding of CABAC type or else an entropy decoding of arithmetic or Huffman type.

Such a decoding D2 is not necessary in the case where the decoder DO makes a distinction in an autonomous manner between:
- a current image to be decoded of 2D type or else obtained by projection of a mono video, 360°, 180° or other,
- and a current image to be decoded obtained by projection of a stereo video, 360°, 180° or other, and composed according to a technique of FP type.

In the subsequent description, it is considered that the current image to be decoded has been obtained by projection of a stereo video, 360°, 180° or other, and that the current image is composed of several views captured at the same temporal instant and arranged in the current image so as to form a single view (rectangle of pixels).

With reference to FIG. 6A, there is undertaken at D3 the identification, in the signal F, of the coded data $DC_1$, $DC_2, \ldots, DC_u, \ldots, DC_S$ (1≤u≤S) associated respectively with the blocks $B_1, B_2, \ldots, B_u, \ldots, B_S$ coded previously in accordance with the aforementioned lexicographic order, which have been obtained on completion of the coding operation C5a) or C5b) of FIG. 1A. This signifies that the blocks are decoded one after another, from left to right, in a corresponding manner to the order of coding mentioned above.

Such an identification D3 is implemented by the stream analysis device PARS_D of FIG. 7A.

Other types of traversal than that which has just been described hereinabove are of course possible and depend on the order of traversal chosen on coding.

According to an example, the blocks $B_1, B_2, \ldots, B_u, \ldots, B_S$ have a square shape and all contain K pixels, with K≥1. By way of non-exhaustive example, the blocks have a size of 64×64 pixels and/or 32×32 and/or 16×16 and/or 8×8 pixels.

As a function of the size of the image which is not necessarily a multiple of the size of the blocks, the last blocks on the left and the last blocks at the bottom might not be square. In an alternative embodiment, the blocks may be for example of rectangular size and/or not aligned with one another.

With reference to FIG. 6A, at D4, the decoder DO of FIG. 7A selects as current block to be decoded a current set of coded data $DC_u$ of the image $IC_j$, which set is associated with a block $B_u$ to be decoded.

At D5, there is undertaken the location of the current block $B_u$ to be decoded of the image $IC_j$, for example by determining its coordinates with respect to the first reconstructed pixel of the image $IC_j$, which pixel is situated at the top left of the latter and has coordinates (0,0).

The location D5 is implemented by a calculation device CAL1_D such as represented in FIG. 7A, which device is driven by the processor PROC_D.

Figure 8:
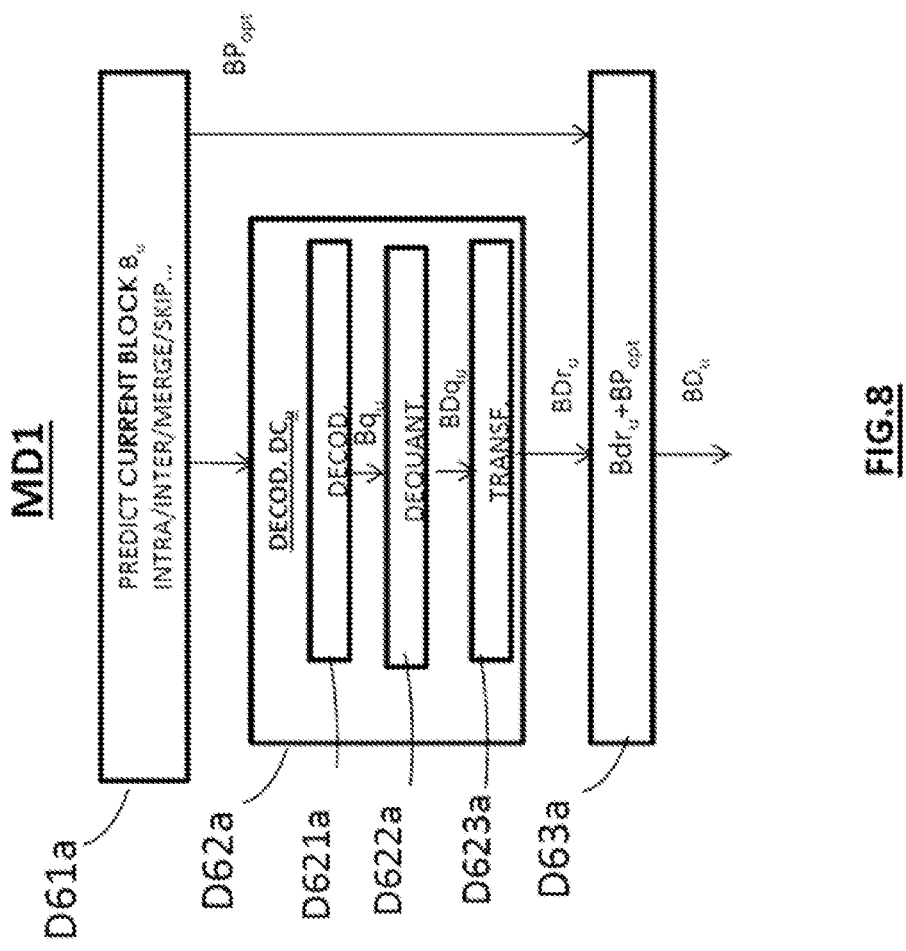
FIG. 8 represents an exemplary conventional decoding scheme implemented in the methods of decoding of FIGS. 6A and 6B.

If the current block $B_u$ belongs to the first zone Z1 of the image $IC_j$, with reference to FIG. 6A, there is undertaken at D6a) the decoding of the current block with the aid of a first decoding scheme MD1 which corresponds to the coding scheme MC1 applied on coding, at C5a) in FIG. 1A. The first decoding scheme MD1 is a conventional scheme, an example of which is illustrated in FIG. 8. The decoding scheme MD1 is applied to any current block of the zone Z1.

With reference to FIG. 8, a conventional decoding scheme MD1 such as this implements at D61a) the decoding of prediction information previously read in the signal F, such as the type of prediction, Inter, Intra, skip or Merge applied to the current block $B_u$, and if relevant, the prediction mode selected, the index of the predictor block $BP_{opt}$ which has been obtained during the prediction C51a) (FIG. 4) which has been implemented on coding.

On completion of the decoding D61a), the predictor block $BP_{opt}$ associated with the decoded index is obtained.

The coded data $DC_u$ of the current block $B_u$ are decoded at D62a). Such a decoding is implemented by a device for decoding blocks MDB_D which is represented in FIG. 7A, which device is driven by the processor PROC_D.

The decoding D62a) implements, at D621a), a decoding of the data $DC_u$ associated with the current block $B_u$ to be decoded and which have been coded at C5a) in FIG. 1A. On completion of such a decoding, a set of numerical information is obtained, the latter being associated with the block of quantized coefficients $Bq_u$ which was obtained at C532a) in FIG. 4.

The decoding D621a) is implemented by the decoding device MD_D represented in FIG. 7A.

The decoding D62a) furthermore implements a dequantization D622a) of the block of quantized coefficients $Bq_u$, according to a conventional dequantization operation which is the operation inverse to the quantization C532a) of FIG. 4. A current set of dequantized coefficients $BDq_u$ is then obtained. Such a dequantization is for example of scalar or vector type and is implemented by means of an inverse quantization device $MQ^{-1}$_D, such as represented in FIG. 7A, which device is driven by the processor PROC_D.

The decoding D62a) furthermore implements the application D623a) of a transform to the current set of dequantized coefficients $BDq_u$ obtained at D622a). In a manner known per se, such a transform is a transform inverse to that applied to the coding at C531a) in FIG. 4, such as for example a DCT, DST, DWT, LT or other transform. In a corresponding manner to the coder CO of FIG. 2A, these transforms form part of a list of transforms $LTS1^{-1}$ which is stored previously in the buffer memory MT_D of the decoder DO of FIG. 7A.

The type of transform to be applied can be determined at the decoder conventionally, by reading, in the data signal F, the index of the transform applied to the coding.

The transform application D623a) is performed by a transform calculation device $MTR^{-1}$_D, such as represented in FIG. 7A, which device is driven by the processor PROC_D.

The inverse quantization device $MQ^{-1}$_D and the transform calculation device $MTR^{-1}$_D are contained in a device for decoding blocks MDB_D which is represented in FIG. 7A, which device is driven by the processor PROC_D.

A current decoded residual block $BDr_u$ is obtained on completion of the decoding D62a) of the data of the current block.

With reference to FIG. 8, at D63a), the current decoded residual block $BDr_u$ is added to the predictor block $BP_{opt}$ obtained at D61a).

The operation D63a) is implemented by a predictive decoding device PRED_D represented in FIG. 7A, which device is driven by the processor PROC_D.

A current decoded block $BD_u$ is obtained on completion of the operation D63a).

With reference again to FIG. 6A, there is undertaken at D7a) the writing of the current decoded block $BD_u$ in a decoded image $ID_j$.

The writing D7a) is implemented by an image reconstruction device URI such as represented in FIG. 7A, the device URI being driven by the processor PROC_D.

With reference to FIG. 6A, if on completion of the location D5, the current block $B_u$ belongs to the second zone Z2 of the image $IC_j$, there is undertaken at D6b) the decoding of the current block with the aid of a second decoding scheme MD2 which corresponds to the coding scheme MC2 applied on coding, at C5b) in FIG. 1A. According to the first embodiment, the second decoding scheme MD2 is applied to any current block to be decoded which is situated in the second zone Z2.

According to the invention, with reference to FIG. 6A, there is undertaken at D61b) the identification of a reference block $B_{ref}$ which has been previously decoded, and which is situated in the first zone Z1 of the current image $IC_j$ undergoing decoding.

The identification D61b) is implemented by a calculation device CAL2_D such as represented in FIG. 7A, which device is driven by the processor PROC_D. The identification D61b) is identical to the identification C51b) carried out on coding with reference to FIG. 1A.

According to a preferred embodiment, if the current block which has been located in the second zone Z2 has its first pixel at the top left which has coordinates $(x_u, Y_u)$ in the current image $IC_j$, then a reference block $B'_{ref}$ is determined in the first zone Z1, as being the block whose first pixel $p'_{ref}$ at the top left has coordinates $(X'_{ref}, y'_{ref})$, such that $x'_{ref}=x_u$ and $y'_{ref}=y_u-h/2$, where h is the top of the current image $IC_j$.

Examples of determination of the reference block $B'_{ref}$ have already been explained with reference to FIGS. 5A and 5B and will not be described again here.

The reference block $B_{ref}$ having been identified in the first zone Z1, with reference to FIG. 6A, the device PARS_D of FIG. 7A undertakes at D62b) the reading, in the signal F, of at least one syntax element $ES\_PRC_1$ which indicates whether or not a coding parameter $PRC_1$ of the reference block $B_{ref}$ is a parameter whose value has been copied for the current block $B_u$.

There is then undertaken at D63b) the decoding of the syntax element $ES\_PRC_1$.

The decoding D63b) is for example an entropy decoding of CABAC type or else an entropy decoding of arithmetic or Huffman type. This decoding is implemented by the coding device MD_D of FIG. 7A.

For example:
  if the decoded value of the syntax element $ES\_PRC_1$ is equal to 1, the coding parameter $PRC_1$ is used directly as decoding parameter $PRD_1$ of the current block,
  if the decoded value of the syntax element $ES\_PRC_1$ is equal to 0, the coding parameter $PRC_1$ is then decoded with the aid of a conventional decoding scheme.

According to one embodiment, in the course of the coding D63b), K syntax elements $ES\_PRC_1$, $ES\_PRC_2$, . . . , $ES\_PRC_K$ are decoded, these indicating whether or not each of the coding parameters $PRC_1, PRC_2, \ldots, PRC_K$ associated with the reference block $B_{ref}$ is a parameter whose value has been copied during the coding of the current block.

Of course, it may be decided to decode only some of the K syntax elements hereinabove if only some of the K syntax elements have been coded on coding at C54b) (FIG. 1A). According to one embodiment, by assuming that the decoded value, which was obtained at D2, of the syntax element activateStereoReuse has the value 1, the binary sequence 1101 signifies for example that:
  the syntax element activateStereoReuse has been coded at C2 to the value 1,
  the type of partitioning which has been applied to the reference block $B_{ref}$ is used directly as decoding parameter of the current block,
  the type of transform which has been applied to the reference block $B_{ref}$ is not used directly as decoding parameter of the current block and is decoded in a conventional manner,
  the value of the quantization interval used during the coding of the reference block $B_{ref}$ is used directly as decoding parameter of the current block.

With reference to FIG. 7A, at least one decoding parameter $PRD_1$ associated with the reference block $B_{ref}$ is stored in a list LST2 of the buffer memory MT_D of the decoder DO.

By way of non-exhaustive example, the list LST2 of the decoder DO of FIG. 7A contains a number K of decoding parameters $PRD_1, PRD_2, \ldots, PRD_K$ associated with the identified reference block $B_{ref}$ and which are respectively identical to the K coding parameters $PRC_1, PRC_2, \ldots, PRC_K$ stored in the list LST2 of the coder CO of FIG. 2A. Examples of such parameters have already been described during the coding method of FIG. 1A and will not be described again here.

With reference to FIG. 6A, there is undertaken, at D64b), the copying of the value of the coding parameter $PRC_1$ associated with the syntax element $ES\_PRC_1$, for the current block $B_u$. To this effect, the value, decoded at D63b), of the decoding parameter $PRD_1$ is assigned to the current block $B_u$.

On completion of the application of the second decoding scheme MD2 to the current block, a current decoded block $BD_u$ is obtained.

The image reconstruction device URI of FIG. 7A undertakes at D7b) the writing of the current decoded block $BD_u$ in a decoded image $ID_j$.

According to the first embodiment which has just been described with reference to FIG. 6A:
  the decoding operations D1 to D7a) are implemented for each block of the first zone Z1 of the current image $IC_j$,
  the decoding operations D1 to D7b) are implemented for each block of the second zone Z2 of the current image $IC_j$.

We shall now describe a second embodiment of the decoding method according to the invention, with reference to FIG. 6B.

Figure 7B:
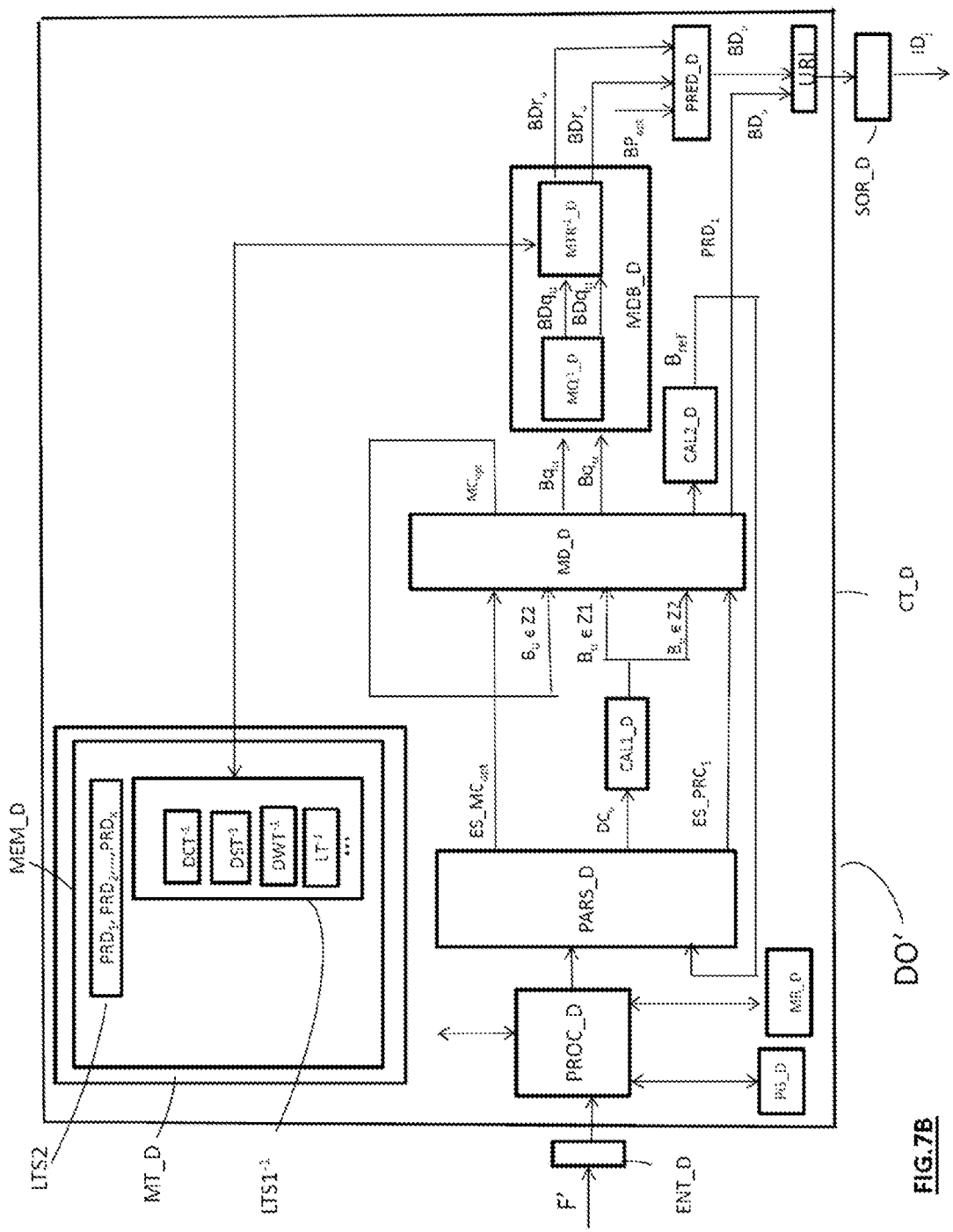
FIG. 7B represents a decoding device according to a second embodiment of the invention.

According to this second embodiment of the invention, the decoding method is implemented in a decoding device or decoder DO' represented in FIG. 7B which comprises elements similar to those of the decoder DO of FIG. 7A. For reasons of simplification, similar elements such as these are repeated in FIG. 7B with the same references as in FIG. 7A.

According to the second embodiment, the first decoding scheme MD1 is applied to any current block situated in the first zone Z1, exactly in the same way as in the first embodiment of FIG. 6A. The second embodiment is distinguished from that of FIG. 6A by the fact that the second decoding scheme MD2 is not systematically applied to each current block located in the second zone Z2. To this effect, once the current block $B_u$ has been located in the second zone Z2 of the current image to be decoded, there is undertaken at D100b) the reading, in the signal F', of the syntax element $ES\_MC_{opt}$ which indicates which coding scheme MC1 or MC2 has been selected subsequent to the competition implemented on coding at C200b) in FIG. 1B. The reading D100b) is implemented by the device PARS_D of FIG. 7B.

There is then undertaken at D200b) the decoding of the syntax element $ES\_MC_{opt}$.

The decoding D200b) is for example an entropy decoding of CABAC type or else an entropy decoding of arithmetic or Huffman type. This decoding is implemented by the coding device MD_D of FIG. 7B.

If the decoded value of the syntax element $ES\_MC_{opt}$ is equal to 1, the current block is decoded with the aid of the second decoding scheme MD2, exactly in the same way as at D5b) in FIG. 6A, according to the first embodiment.

If the decoded value of the syntax element $ES\_MC_{opt}$ is equal to 0, the current block is decoded at D300b) with the aid of the first decoding scheme MD1 which has been applied to each current block of the first zone Z1 of the current image, exactly in the same way as at D5a) in FIG. 6A, according to the first embodiment.

The decoding scheme MD1 is for example the decoding scheme represented in FIG. 8. Such a decoding 300b) is implemented by the decoding device MD_D, the device for decoding blocks MDB_D and the predictive decoding device PRED_D and which are illustrated in FIG. 7B.

On completion of the application of the first decoding scheme MD1 or of the second decoding scheme MD2 to the current block, a current decoded block $BD_u$ is obtained.

The image reconstruction device URI of FIG. 7B undertakes at D400b) the writing of the current decoded block $BD_u$ in a decoded image $ID_j$.

According to the second embodiment which has just been described with reference to FIG. 6B:
the decoding operations D1 to D7a) are implemented for each block of the first zone Z1 of the current image $IC_j$,
the decoding operations D1 to D400b) are implemented for each block of the second zone Z2 of the current image $IC_j$.

It goes without saying that the embodiments which have been described hereinabove have been given purely by way of wholly nonlimiting indication, and that numerous modifications can easily be made by the person skilled in the art without however departing from the scope of the invention.

The invention claimed is:

1. A coding method for coding an image split up into blocks, said image containing first and second distinct zones, each of said zones comprising a respective plurality of the blocks, said coding method comprising the following acts performed by a coding device for at least one current block of the image:
    determining to which of the first and second zones said at least one current block belongs,
    if said at least one current block is one of the plurality of blocks belonging to the first zone, coding the said at least one current block using a first coding scheme to obtain coded data of said at least one current block in which, for at least one coding parameter used to code said at least one current block, said at least one coding parameter is coded, and
    if said at least one current block is one of the plurality of blocks belonging to the second zone, coding said at least one current block using a second coding scheme to obtain the coded data of said at least one current block in which, for at least one coding parameter used to code said at least one current block, said at least one coding parameter is not coded, the second coding scheme comprising:
        on the basis of a position of said at least one current block in the second zone, identifying a previously coded, and then decoded, block situated in the first zone of the image,
        copying for said at least one current block in the second zone a value of at least one coding parameter of the identified block, as the value of said at least one coding parameter of said at least one current block in the second zone, said copied value being not coded by said coding device.

2. The coding method as claimed in claim 1, in which the second coding scheme is applied to all the blocks of the second zone of the current image.

3. The coding method as claimed in claim 1, implementing the following:
    coding said at least one current block of the second zone of the image using the first coding scheme,
    selecting the first coding scheme or the second coding scheme in accordance with a predetermined coding performance criterion,
    coding an item of information representative of said selection.

4. The coding method as claimed in claim 1, in which the first and second zones of the image have a same shape, the first zone being situated above the second zone and separated from the second zone by a horizontal boundary extending along the middle of the image.

5. The coding method as claimed in claim 1, further comprising constructing a signal, the signal comprising:
    if said at least one current block is one of the plurality of blocks belonging to the first zone, the coded data of said at least one current block and the coded value of the at least one coding parameter of the at least one current block; and
    if said at least one current block is one of the plurality of blocks belonging to the second zone, the coded data of said at least one current block and not the copied value of the at least one coding parameter of the at least one current block, which is not coded by said coding device.

6. A coding device for coding at least one image split up into blocks, said image containing first and second distinct zones, each of said zones comprising a respective plurality of the blocks, wherein the coding device comprises:
    a processing circuit which is designed to implement the following, for at least one current block of the image:
    determine to which of the first and second zones said at least one current block belongs,
    if said at least one current block is one of the plurality of blocks belonging to the first zone, code said at least one current block using a first coding scheme, in which, for at least one coding parameter used to code said at least one current block, said at least one coding parameter is coded,
    if said at least one current block is one of the plurality of blocks belonging to the second zone, code said at least one current block using a second coding scheme in which, for at least one coding parameter used to code said at least one current block, said at least one coding parameter is not coded, the second coding scheme comprising:
        on the basis of a position of said at least one current block in the second zone, identify a previously coded, and then decoded, block situated in the first zone of the image,
        copy for said at least one current block in the second zone a value of at least one coding parameter of the identified block, as the value of said at least one coding parameter of said at least one current block in the second zone, said copied value being not coded by said coding device.

7. A non-transitory computer-readable recording medium on which is recorded a computer program comprising program code instructions for execution of a method for coding an image split up into blocks, when said program is executed by a processor of a coding device, said image containing first and second distinct zones, each of said zones comprising a respective plurality of the blocks, wherein the instructions configure the coding device to perform the following acts for at least one current block of the image:
    determining to which of the first and second zones said at least one current block belongs,
    if said at least one current block is one of the plurality of blocks belonging to the first zone, coding said at least one current block using a first coding scheme, in which, for at least one coding parameter used to code said at least one current block, said at least one coding parameter is coded, and if said at least one current block is one of the plurality of blocks belonging to the second zone, coding said at least one current block using a second coding scheme in which, for at least one coding parameter used to code said at least one current block, said at least one coding parameter is not coded, the second coding scheme comprising:

on the basis of a position of said at least one current block in the second zone, identifying a previously coded, and then decoded, block situated in the first zone of the image, copying for said at least one current block in the second zone a value of at least one coding parameter of the identified block, as the value of said at least one coding parameter of said at least one current block in the second zone, said copied value being not coded by said coding device.

8. A method for decoding a data signal representative of an image split up into blocks which has been coded, said at least one image containing first and second distinct zones, each of said zones comprising a respective plurality of the blocks, said decoding method comprising the following acts performed by a decoding device for at least one current block to be decoded of the image:

determining to which of the first and second zones said at least one current block belongs, if said at least one current block is one of the plurality of blocks belonging to the first zone, decoding said at least one current block using a first decoding scheme, in which, for at least one decoding parameter used to code said at least one current block, said at least one decoding parameter is decoded, if said at least one current block is one of the plurality of blocks belonging to the second zone, decoding said at least one current block using a second decoding scheme, in which, for at least one decoding parameter used to code said at least one current block, said at least one decoding parameter is not decoded, the second decoding scheme comprising:

on the basis of a position of said at least one current block in the second zone, identifying a previously decoded block, situated in the first zone of the image, assigning to said at least one current block in the second zone a value of at least one decoding parameter of said identified block, as the value of said at least one decoding parameter of said at least one current block in the second zone, said assigned value being not decoded by said decoding device.

9. The decoding method as claimed in claim 8, in which the second decoding scheme is applied to all the blocks of the second zone of the current image.

10. The decoding method as claimed in claim 8, in which the second decoding scheme is applied to said at least one current block of the second zone if, for said at least one current block, an item of information in respect of selection of said second decoding scheme is read in the data signal, the first decoding scheme being applied to said at least one current block of the second zone if, for said at least one current block, an item of information in respect of selection of said first decoding scheme is read in the data signal.

11. The decoding method as claimed in claim 8, in which the first and second zones of the image have a same shape, the first zone being situated above the second zone and separated from the second zone by a horizontal boundary extending along the middle of the image.

12. A decoding device for decoding a data signal representative of an image split up into blocks which has been coded, said at least one image containing first and second distinct zones, each of said zones comprising a respective plurality of the blocks, wherein the decoding device comprises:

a processing circuit which is designed to implement the following, for at least one current block to be decoded of the image:

determine to which of the first and second zones said at least one current block belongs, if said at least one current block is one of the plurality of blocks belonging to the first zone, decode said at least one current block using a first decoding scheme, in which, for at least one decoding parameter used to code said at least one current block, said at least one decoding parameter is decoded, if said at least one current block is one of the plurality of blocks belonging to the second zone, decode said at least one current block using a second decoding scheme in which, for at least one decoding parameter used to code said at least one current block, said at least one decoding parameter is not decoded, the second decoding scheme comprising:

on the basis of a position of said at least one current block in the second zone, identify a previously decoded block, situated in the first zone of the image, assign to said at least one current block in the second zone a value of at least one decoding parameter of said identified block, as the value of said at least one decoding parameter of said at least one current block in the second zone, said assigned value being not decoded by said decoding device.

13. A non-transitory computer-readable recording medium on which is recorded a computer program comprising program code instructions for execution of a method for decoding a data signal representative of an image split up into blocks which has been coded, when said program is executed by a processor of a decoding device, said at least one image containing first and second distinct zones, each of said zones comprising a respective plurality of the blocks, wherein the instructions configure the decoding device to perform the following acts for at least one current block to be decoded of the image:

determining to which of the first and second zones said at least one current block belongs, if said at least one current block is one of the plurality of blocks belonging to the first zone, decoding said at least one current block using a first decoding scheme, in which, for at least one decoding parameter used to code said at least one current block, said at least one decoding parameter is decoded, if said at least one current block is one of the plurality of blocks belonging to the second zone, decoding said at least one current block using a second decoding scheme in which, for at least one decoding parameter used to code said at least one current block, said at least one decoding parameter is not decoded, the second decoding scheme comprising:

on the basis of a position of said at least one current block in the second zone, identifying a previously decoded block, situated in the first zone of the image, assigning to said at least one current block in the second zone a value of at least one decoding parameter of said identified block, as the value of said at least one decoding parameter of said at least one current block in the second zone, said assigned value being not decoded by said decoding device.

* * * * *